US009368273B2

(12) United States Patent
Ram Rakhyani et al.

(10) Patent No.: US 9,368,273 B2
(45) Date of Patent: Jun. 14, 2016

(54) APPARATUS, SYSTEM, AND METHOD FOR MULTICOIL TELEMETRY

(75) Inventors: Anil K. Ram Rakhyani, Salt Lake City, UT (US); Gianluca Lazzi, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 741 days.

(21) Appl. No.: 13/417,145

(22) Filed: Mar. 9, 2012

(65) Prior Publication Data

US 2012/0228958 A1     Sep. 13, 2012

Related U.S. Application Data

(60) Provisional application No. 61/464,949, filed on Mar. 11, 2011.

(51) Int. Cl.
| | | |
|---|---|---|
| *H01F 38/14* | (2006.01) | |
| *H02J 5/00* | (2016.01) | |
| *H02J 7/02* | (2016.01) | |

(52) U.S. Cl.
CPC ................ *H01F 38/14* (2013.01); *H02J 5/005* (2013.01); *H01F 2038/143* (2013.01); *H02J 7/025* (2013.01); *Y10T 29/4902* (2015.01)

(58) Field of Classification Search
CPC ........... H02J 5/005; H02J 7/025; H02J 17/00; H01F 38/14; A61N 1/37223; A61N 1/3787
USPC .............................. 307/104; 607/61; 320/108
See application file for complete search history.

(56) References Cited

U.S. PATENT DOCUMENTS 5,260,701 A * 11/1993 Guern et al. ............... 340/10.34

8,362,651 B2 * 1/2013 Hamam et al. ............... 307/104
(Continued)

FOREIGN PATENT DOCUMENTS

WO    WO 2010124321 A1 * 11/2010

OTHER PUBLICATIONS

Zierhofer, C.M. et al., "Geometric Approach for Coupling Enhancement of Magnetically Coupled Coils," IEEE Transactions on Biomedical Engineering, vol. 43, No. 7, Jul. 1996, pp. 708-714.
A. Kumar, S. Mirabbasi, and M. Chiao, "Resonance-Based Wireless Power Delivery for Implantable Devices," in IEEE Biomedical Circuits and Systems Conference (BioCAS), Nov. 26-28, 2009 pp. 25-28.
(Continued)

*Primary Examiner* — Jared Fureman
*Assistant Examiner* — Joel Barnett
(74) *Attorney, Agent, or Firm* — Norton Rose Fulbright US LLP

(57) ABSTRACT

An apparatus, system, and method for multicoil telemetry are disclosed. In one embodiment, the apparatus includes an intermediate coil disposed between a driving coil and a receiving coil, where the intermediate coil is configured to act on magnetic fields between the driving coil and receiving coil in order to provide improved coupling efficiency. The improved coupling may assist in providing efficient power transfer and/or data transfer utilizing the magnetic fields. In some embodiments the receiving coil may be in direct communication with the intermediate coil, without any other intermediate coils. In some embodiments, the apparatus includes a second intermediate coil disposed between the driving coil and receiving coil to improve the transfer efficiency between the driving and receiving coils. The intermediate coils may have a high quality factor and be configured to decouple the resistance between the driving and receiving coils.

40 Claims, 15 Drawing Sheets

(56) References Cited

U.S. PATENT DOCUMENTS

| | | | | |
|---|---|---|---|---|
| 8,551,163 | B2* | 10/2013 | Aber et al. | 623/3.14 |
| 2008/0266748 | A1* | 10/2008 | Lee | H02J 5/005 361/270 |
| 2011/0115429 | A1* | 5/2011 | Toivola et al. | 320/108 |
| 2012/0112552 | A1* | 5/2012 | Baarman et al. | 307/104 |

OTHER PUBLICATIONS

RamRakhyani, Anil Kumar, et al., "Design and Optimization of Resonance-Based Efficient Wireless Power Delivery Systems for Biomedical Implants," IEEE, Transactions on Biomedical Circuits and Systems, vol. 5, No. 1, Feb. 2011, pp. 48-63 (date of publication Oct. 7, 2010).

* cited by examiner

APPARATUS, SYSTEM, AND METHOD FOR MULTICOIL TELEMETRY

CROSS-REFERENCE TO RELATED APPLICATIONS

This application claims priority to U.S. Provisional Patent Application No. 61/464,949, filed Mar. 11, 2011 and entitled, "DESIGN OF EFFICIENT MULTICOIL TELEMETRY SYSTEM FOR BIOMEDICAL IMPLANTS," the entire contents of which are specifically incorporated herein by reference without disclaimer.

GOVERNMENT INTEREST

This invention was made with government support under grant no. EEC0310723 awarded by The National Science Foundation. The government has certain rights in this invention.

TECHNICAL FIELD

This invention relates to multicoil telemetry and more particularly relates to transferring power and/or data using inductive coupling via a wireless link.

BACKGROUND OF THE INVENTION

Biomedical implants have actively been in use for stimulation and monitoring internal vital signs. Implanted sensors, drug delivery devices, neuro-stimulator and endoscopes are some of the main devices currently used for medical applications. The power requirement of these devices vary with their applications and can range from a few microwatts to hundreds of milliwatts. Because of power requirements and implant size, few devices rely on implanted batteries and most of applications use wireless power transfer to operate the implanted device or to recharge the implanted battery.

Inductive coupling between an external source and an implanted device is a popular technique for wireless power transfer to implanted devices. Traditional inductive coupling based power transfer systems use two coils in which power is transferred from external (driver) coil to implant (load) coil. The power transfer efficiency strongly depends on magnetic coupling between the coils which is governed by factors such as size, structure, physical spacing and relative location of the coils and their electric properties, such as a quality factor (Q-factor). For example, magnetic coupling between an external coil and an implant coil is drastically reduced with increase in coil spacing and hence causes rapid change in power transfer efficiency with coil misalignment.

To optimize the power link performance, electric models of 2-coil based systems have been used to identify the effect of coil parameters and coupling on link efficiency. Using low resistance wire, high unloaded Q-factor coil can be achieved, but due to use of finite source resistance of a driver and high impedance load, a loaded Q-factor can only achieve moderate values. Hence there are limits on the maximum achievable power transfer efficiency (40%) under these design constraints.

Power transfer efficiency is a commonly used metric for improvement to reduce the required power by an external source for a desired power requirement of implanted devices. For telemetry applications, performance is generally measured based on power transfer efficiency as well as on the available voltage gain and data bandwidth over the power link. Performance variations during the operation of a device are one of the main challenges for a 2-coil based system. For example, implanted coils may undergo relative motion with respect to external coils during the operation of device which causes variation in mutual coupling between an external coil and an implanted coil. Additionally, based on the power requirement of the implanted device, effective load resistance may vary and cause variation in the Q-factor of a receiving inductive unit. Hence, to ensure stable link performance, a design should have high tolerance with change in operating distance, coil misalignment, and device operation mode.

SUMMARY

The present application discloses apparatuses, systems and methods for multi-coil based wireless power and/or data transfer. In one embodiment, a system includes an intermediate coil disposed between a driving coil and a receiving coil, where the intermediate coil is configured to reduce the power loss in the driver resistance in order to provide for improved power transfer efficiency. It is noted that in some embodiments the receiving coil may be in direct communication with the intermediate coil, e.g. without the use of any other intermediate coils. The intermediate coil may have a high quality factor and be configured to decouple the resistance between the driver and intermediate coil. Embodiments may also utilize four coils, which include two intermediate coils, and provide power and data transfer capabilities while utilizing intermediate coils to reduce the losses in driver and load coil.

In one embodiment, the apparatus includes a driving coil, and an intermediate coil disposed between the driving coil and a receiving coil. The driving coil is coupled to an electric source and is configured to generate an alternating magnetic field. The intermediate coil has a high quality factor and is configured to decouple the resistance between the driver and intermediate coil. The intermediate coil is further configured to alter the shape of the generated alternating magnetic field to optimize coupling efficiency between the driving coil and the receiving coil. The receiving coil is implanted in an object and is configured to capture the alternating magnetic field generated by the driving coil, and provide a voltage output. In one embodiment, the receiving coil is in direct communication with the intermediate coil, without any other intermediate coils.

In some embodiments, the apparatus further includes a second intermediate coil disposed between the intermediate coil and the receiving coil, where the second intermediate coil is disposed proximate to the receiving coil. The second intermediate coil has a high Q-factor and is configured to alter the shape of the alternating magnetic field to optimize coupling efficiency between the receiving coil and the driving coil. In such embodiment, the apparatus is further configured to transmit data using the alternating magnetic field.

In one embodiment, the apparatus and system are configured to transfer power or data between the driving and receiving coils via a wireless link. The apparatus and system may be also configured to charge, via a wireless link, a battery connected to the receiving coil, which is implanted in an object. The object may be a human body, an animal, or other organism. The object may also be a machine, a robot or other electronic device. In one embodiment, the apparatus and system may also be configured to transmit a control signal to the receiving coil to operate the object in which the receiving coil is implanted.

In one embodiment, the system includes a receiving coil, where the receiving coil is configured to capture an alternating magnetic field from a driving coil and provide a voltage output. The system also includes an intermediate coil disposed between the receiving coil and the driving coil, where the intermediate coil is disposed proximate to the receiving coil. The intermediate coil is configured to alter the shape of the alternating magnetic field to optimize coupling efficiency between the receiving coil and the driving coil. The receiving coil is configured to be in communication with the driving coil without any other intermediate inductive units. The driving coil is configured to generate an alternating magnetic field.

In one embodiment, the system further includes a second intermediate coil disposed between the intermediate coil and the receiving coil, where the second intermediate coil is disposed proximate to the driving coil. The second intermediate coil is configured to alter the shape of the alternating magnetic field to optimize coupling efficiency between the receiving coil and the driving coil. In such an embodiment, the system is further configured to transmit data using the alternating magnetic field. The second intermediate coil has a high quality factor and is configured to decouple the resistance between the driving coil and second intermediate coil.

Embodiments of methods are also presented for multicoil telemetry. In one embodiment, the method includes forming a driving coil. The driving coil is coupled to an electric source and configured to generate an alternating magnetic field. The method also includes forming a intermediate coil, where the intermediate coil is disposed between the driving coil and a receiving coil. The intermediate coil has a high quality factor and is configured to decouple the resistance between the driver and intermediate coil. The intermediate coil is further configured to alter the shape of the generated alternating magnetic field to optimize coupling efficiency between the driving coil and the receiving coil. The receiving coil is configured to capture the alternating magnetic field generated by the driving coil, and provide a voltage output. In one embodiment, the receiving coil communicates with the driving coil without any other extra intermediate coils. The receiving coil may be implanted in an object, such as a human body, a machine, a robot, or the like.

The term "coupled" is defined as connected, although not necessarily directly, and not necessarily mechanically. The terms "a" and "an" are defined as one or more unless this disclosure explicitly requires otherwise. The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

The foregoing has outlined rather broadly the features and technical advantages of the present invention in order that the detailed description that follows may be better understood. Additional features and advantages will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of embodiments of the present invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the embodiments of the present application.

BRIEF DESCRIPTION OF THE DRAWINGS

For a more complete understanding of the present application, reference is now made to the following descriptions taken in conjunction with the accompanying drawings, in which.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those having ordinary skill in the art from this disclosure.

Figure 1:
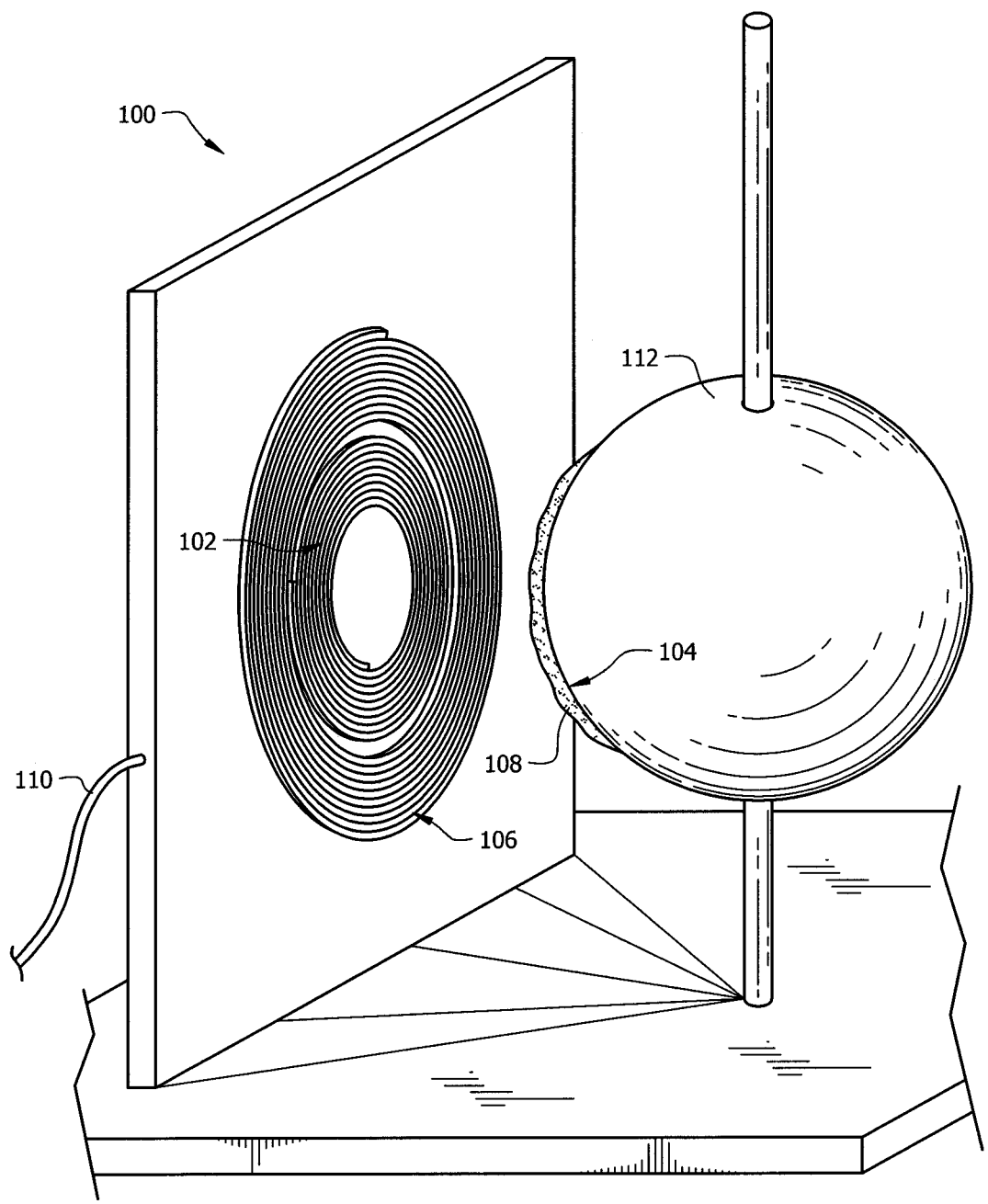
FIG. 1 is a schematic diagram illustrating one embodiment of a system for multicoil telemetry.
Figure 3A:
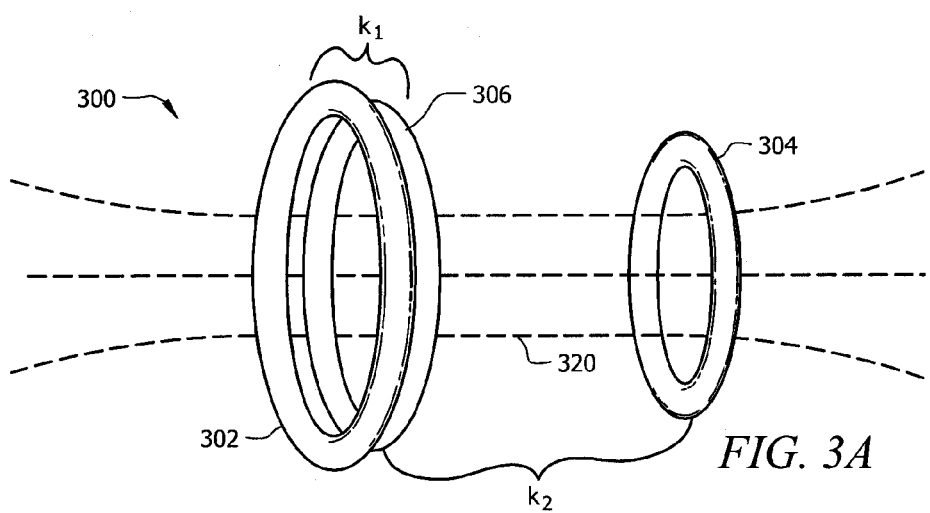
FIGS. 3A-3B are schematic diagrams illustrating embodiments of an apparatus for multicoil telemetry.
Figure 3B:
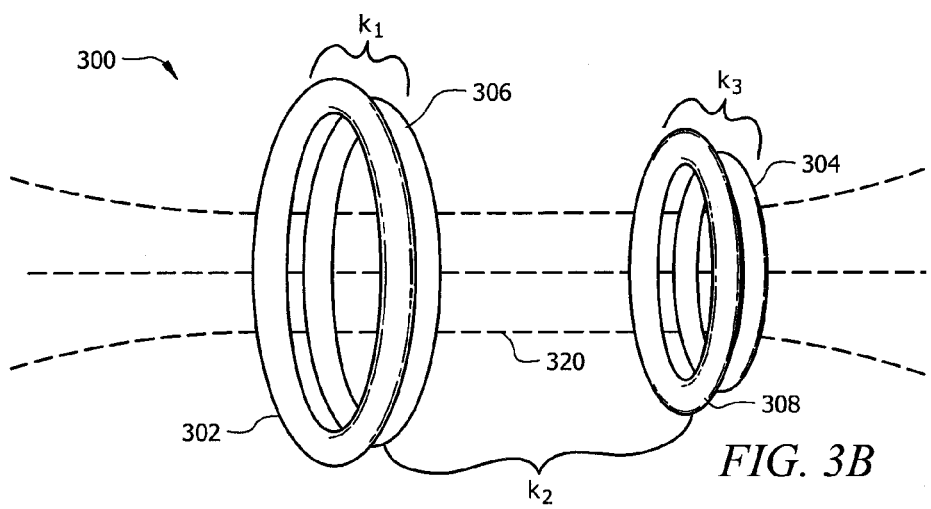

FIG. 1 illustrates one embodiment of a system 100 for multicoil telemetry. The system 100 may include an electric source 110 configured to provided a voltage to the system 100. The system 100 may also include a driving inductive unit 102, a receiving inductive unit 104, a first intermediate inductive unit 106, and a second intermediate inductive unit 108, where, in the depicted embodiment, all the inductive units are coils. In the illustrated embodiment, the first intermediate inductive unit 106 is a coil that is proximal to a driving inductive unit 102. It is noted that embodiments may place the first intermediate inductive unit 106 in the same plane (concentric) with the driving inductive unit 102, or in other embodiments the placement may be at proximate to driving inductive unit 102, but displaced some amount of distance, such as up to 5 mm away from driving inductive unit 102. The receiving coil 104 and the second intermediate coil 108 may be implanted into or attached to an object 112. In the illustrated embodiment, object 112 is an eye and receiving coil 104 and second intermediate coil 108 are part of an ocular implant device. In one embodiment, the driving coil 102 may be connected to the electric source 110 and generate a magnetic field 320, as shown in FIGS. 3A-3B. In one embodiment, the generated magnetic field 320 may be an alternating magnetic field. In one embodiment, the magnetic field 320 extends through the first intermediate coil 106 and the second intermediate coil 108 and reaches the receiving coil 104. The receiving coil 104 may capture the alternating magnetic field 320 and generate a voltage to be provided to the object 112.

In one embodiment, the first intermediate coil 106 and second intermediate coil 108 may be configured to alter the shape of the generated alternating magnetic field 320 to optimize coupling efficiency between the driving coil 102 and the receiving coil 104. In one embodiment, the first intermediate coil 106 and second intermediate coil 108 have a high quality factor (Q-factor). In general, for biomedical applications the Q-factor of coils may have a moderate value of 10 to 20, while intermediate coils can achieve a high Q-factor of more than 200.

In one embodiment, to reduce the power loss in the coils, low resistive wires may be used to design driving coil 102, receiving coil 104 and/or the intermediate coils 106, 108. In some embodiments, copper may be an ideal candidate for low resistive wires. For biomedical applications, gold may be used due to its biocompatibility.

In an alternative embodiment, the system 100 may not have a second intermediate coil 108. In such an embodiment, the magnetic field 320 extends through the first intermediate coil 106 and reaches the receiving coil 104, where the receiving coil 104 may capture the alternating magnetic field 320 and generate a voltage to be provided to the object 112. In such an embodiment, the receiving coil 104 communicates with the driving coil 102 without any other intermediate inductive units.

In one embodiment, data may be transferred from the driving coil 102 to the receiving coil 104 through the magnetic field 320, which is a wireless link. In one embodiment, power may be transferred from the driving coil 102 to the receiving coil 104 through the magnetic field 320. The system 100 may also be configured to charge a battery coupled to the receiving coil 104. The battery, after charged, may provide power to operate a part of the object 112. In one embodiment, the system 100 may also be configured to transmit a control signal to the receiving coil 104 to operate at least a part of the object 112.

As discussed above, in one embodiment, the object 112 may be part of a human body. In another embodiment, the object 112 may be an animal or other organism. In yet another embodiment, the object 112 may be an electronic device such as a machine, a robot, an portable electronic device or the like. For example, a mini battery may be attached to the receiving coil 104, which may in turn be configured to power an ocular implant within an eye of a person. Such ocular implants may function to provide artificial vision to patients who are suffering from retinal degenerative diseases such as retinitis pigmentosa (RP) and age-related macular degeneration (AMD). With a voltage is provided by the source 110, the driving coil 102 and first intermediate coil 106 may be moved close to the receiving coil 104, in an operable distance. Power may then be transferred from the driving coil 102 to the receiving coil 104, charging the battery.

Figure 2:
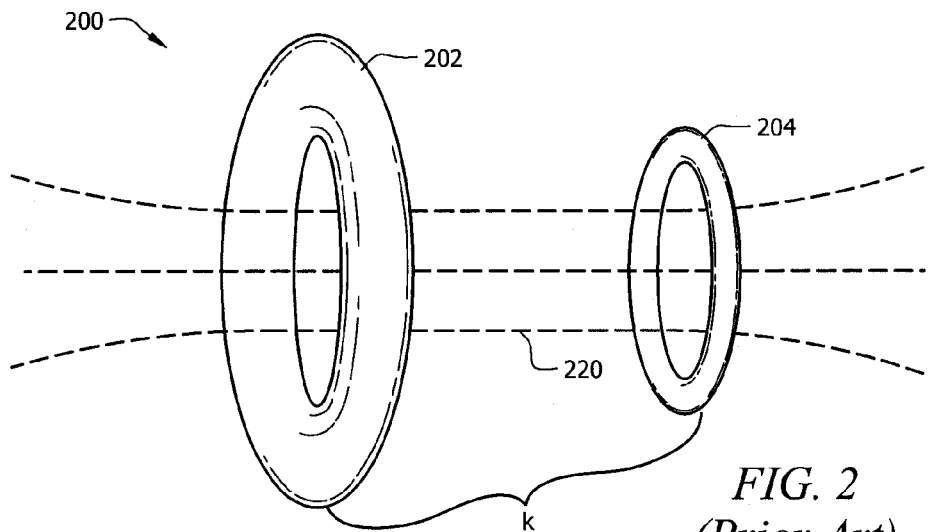
FIG. 2 is a schematic diagram illustrating an apparatus for 2-coil telemetry disclosed in the prior art.

FIG. 2 illustrates an apparatus 200 for 2-coil telemetry disclosed in the prior art. The apparatus 200 may include a driving coil 202, and a receiving coil 204. The driving coil 202 may be connected to an electric source, such as 110 in FIG. 1, and generate an alternating magnetic field 220. The receiving coil 204, disposed distal to the driving coil 202, may be configured to capture the alternating magnetic field 220 and generate a voltage output. The receiving coil 204 may be implanted in an object, such as 112 in FIG. 1. The apparatus 200 may be configured to transfer power via the magnetic field 220.

FIGS. 3A-3B illustrate embodiments of an apparatus 300 for multicoil telemetry. In the depicted embodiment in FIG. 3A, the apparatus 300 may include a driving inductive unit 302, a first intermediate inductive unit 306 and a receiving inductive unit 304. In one embodiment, all the inductive units may be coils. In one embodiment, the driving inductive unit 302 may be connected to an electric source, such as 110 in FIG. 1, and generate an alternating magnetic field 320. The receiving inductive unit 304, disposed distal to the driving inductive unit 302, may be configured to capture the alternating magnetic field 320 and generate a voltage output. In one embodiment, the first intermediate inductive unit 306 may include materials with a high Q-factor. Such materials may include high conductivity material such copper, gold, and the like.

The coupling factor between the driving inductive unit 302 and the first intermediate inductive unit 306 may be represented as $k_1$, and the coupling factor between the first intermediate inductive unit 306 and the receiving inductive unit 304 may be represented as $k_2$. The first intermediate inductive unit 306 may be configured to alter the shape of the generated alternating magnetic field 320 to optimize coupling efficiency between the driving inductive unit 302 and the receiving inductive unit 304. The first intermediate inductive unit 306 may also be configured to decouple the resistance of the driving inductive unit 302 and the first intermediate inductive unit 306, such that the combination may achieve a high Q-factor, e.g., over 200. The driving inductive unit 302 may be connect to a source and its Q-factor may be limited by the source resistance. The first intermediate inductive unit 306 is energized by the driving inductive unit's magnetic field. The first intermediate inductive unit 306, is a self resonating passive coil, its Q-factor is limited by self resistance only and thus it can achieve high Q-factor in order of couple of hundreds. Because the resistance of the driving inductive unit 302 does not affect the Q-factor of first intermediate inductive unit 306, the driving resistance is decoupled from the first intermediate inductive unit 306. Same process occurs to decouple resistance of the receiving inductive unit from the high-Q intermediate inductive unit.

FIG. 3B illustrates another embodiment of an apparatus 300 for multicoil telemetry. The apparatus 300 may include a driving inductive unit 302, a first intermediate inductive unit 306, a second intermediate inductive unit 308, and a receiving inductive unit 304. In one embodiment, the driving inductive unit 302 may be connected to an electric source, such as 110 in FIG. 1, and generate an alternating magnetic field 320. The receiving inductive unit 304, disposed distal to the driving inductive unit 302, may be configured to capture the alternating magnetic field 320 and generate a voltage output. In one embodiment, the first intermediate coil 306 and the second intermediate inductive unit 308 may include materials with a high Q-factor.

In the depicted embodiment, the coupling factor between the driving inductive unit 302 and the first intermediate inductive unit 306 may be represented as $k_1$ the coupling factor between the first intermediate inductive unit 306 and second intermediate inductive unit 308 may be represented as $k_2$, and the coupling factor between the second intermediate inductive unit 308 and the receiving inductive unit 304 may be represented as $k_3$. The first intermediate inductive unit 306 and the second intermediate inductive unit 308 may be configured to alter the shape of the generated alternating magnetic field 320 to optimize coupling efficiency between the driving inductive unit 302 and the receiving inductive unit 304. The first intermediate inductive unit 306 and second intermediate inductive unit 308 may also be configured to decouple the resistance of the driving coil 302 and the receiving inductive unit 304, such that the combination may achieve a high Q-factor. The resistance decoupling of the driving coil 302 and the receiving inductive unit 304 with first and second intermediate inductive units is similar to that explained in FIG. 3A.

In one embodiment, the receiving inductive unit 304 may be implanted in an object, such as 112 in FIG. 1. The object may be a human body, an animal or other organism. The object may also be a machine, a robot, an electronic device, or the like. In one embodiment, the apparatus 300 may be configured to transfer data via the magnetic field 320, e.g., a wireless link. The apparatus 300 may also be configured to transfer power via the magnetic field 320. A battery may be coupled to the receiving inductive unit 304, and the battery may be charged by the power transferred from the driving coil 302 to the receiving inductive unit 304 through the magnetic field 320. In one embodiment, the apparatus 300 may also be configured to assist in operating a part, such as an eye, a heart, or an arm of a person or an animal, of the object in which the receiving inductive unit 304 is implanted.

In one embodiment, the receiving inductive unit 304 may be implanted in an object, such as 112 in FIG. 1. The object may be a human body, an animal or other organism. The object may also be a machine, a robot, an electronic device, or the like. In one embodiment, the apparatus 300 may be configured to transfer data via the magnetic field 320, e.g., a wireless link. The apparatus 300 may also be configured to transfer power via the magnetic field 320. A battery may be coupled to the receiving inductive unit 304, and the battery may be charged by the power transferred from the driving inductive unit 302 to the receiving inductive unit 304 through the magnetic field 320. In one embodiment, the apparatus 300 may also be configured to transmit a control signal to operate a part, such as an eye, a heart, or an arm of a person or an animal, of the object in which the receiving inductive unit 304 is implanted.

In use, the embodiments of FIG. 3A-3B may function to receive a power signal from an electric source to the driving inductive unit 302. The driving inductive unit 302 may generate a time alternating magnetic field. The generated magnetic field will induce a time varying current in the first intermediate inductive unit 306 where the induced current may be determined by the distance between the driving inductive unit 302 and the first intermediate inductive unit 306, the shape of the inductive units, or the like. In the embodiment depicted in FIG. 3A, the altered magnetic field caused by the first intermediate inductive unit 306 may be captured by the receiving inductive unit 304, where energy may be transferred from the driving inductive unit 302 to the receiving inductive unit 304. The efficiency of the energy transmission may be determined by the coupling factors $k_1$, $k_2$, the distances between the inductive units, the shapes of the inductive units, the resistances of the inductive units, or the like.

In the depicted embodiment of FIG. 3B, the generated magnetic field may be further altered by the second intermediate inductive unit 308 where the alteration may be determined by the coupling factor $k_2$, the distance between the inductive units, shapes of the inductive units, or the like. The magnetic field may be then captured by the receiving inductive unit 304 after the magnetic field is further altered by the second intermediate inductive unit 308. The efficiency of the energy transmission may be determined by the coupling factors $k_1$, $k_2$, $k_3$, the distances between the inductive units, the shapes of the inductive units, the resistances of the inductive units, or the like.

In one embodiment, the magnetic field may be represented by signal waves which carry data. The signal waves may be transmitted by the driving inductive unit 302, received by the receiving inductive unit 304, and data may then be decoded from the signal waves. In one embodiment, both data and power may be transferred from the driving inductive unit 302 to the receiving inductive unit 304 simultaneously. For example, information such as vital signs and/or control data may be transferred between the driving inductive unit 302 and the receiving inductive unit 304 in some applications. The data may be modulated using different modulation schemes such as ASK (amplitude shift keying), OOK (ON-OFF keying), FSK (frequency shift keying) or BPSK (Binary Phase Shift Keying) over the wireless inductive link. In one embodiment, the transmitted data may be a control signal to operate at least a part of the object coupled to the receiving inductive unit 304.

Figure 4:
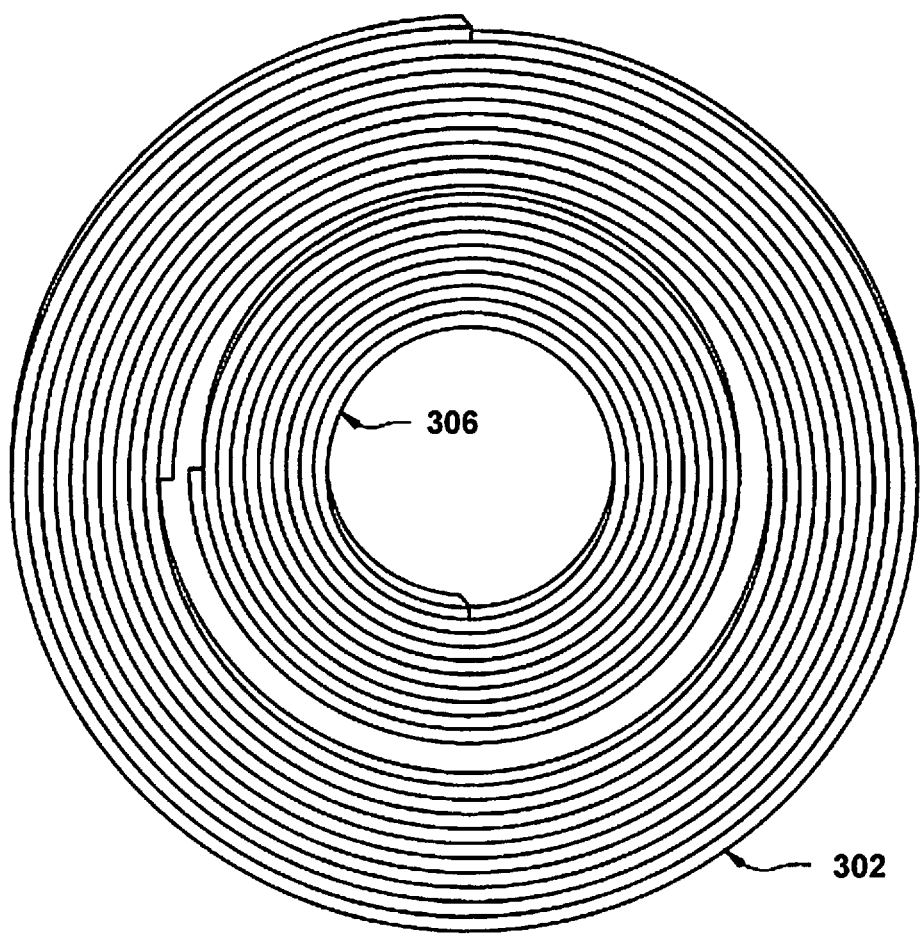
FIG. 4 is a schematic diagram illustrating one embodiment of a driving inductive unit and first intermediate inductive unit for an apparatus for multicoil telemetry.
Figure 5:
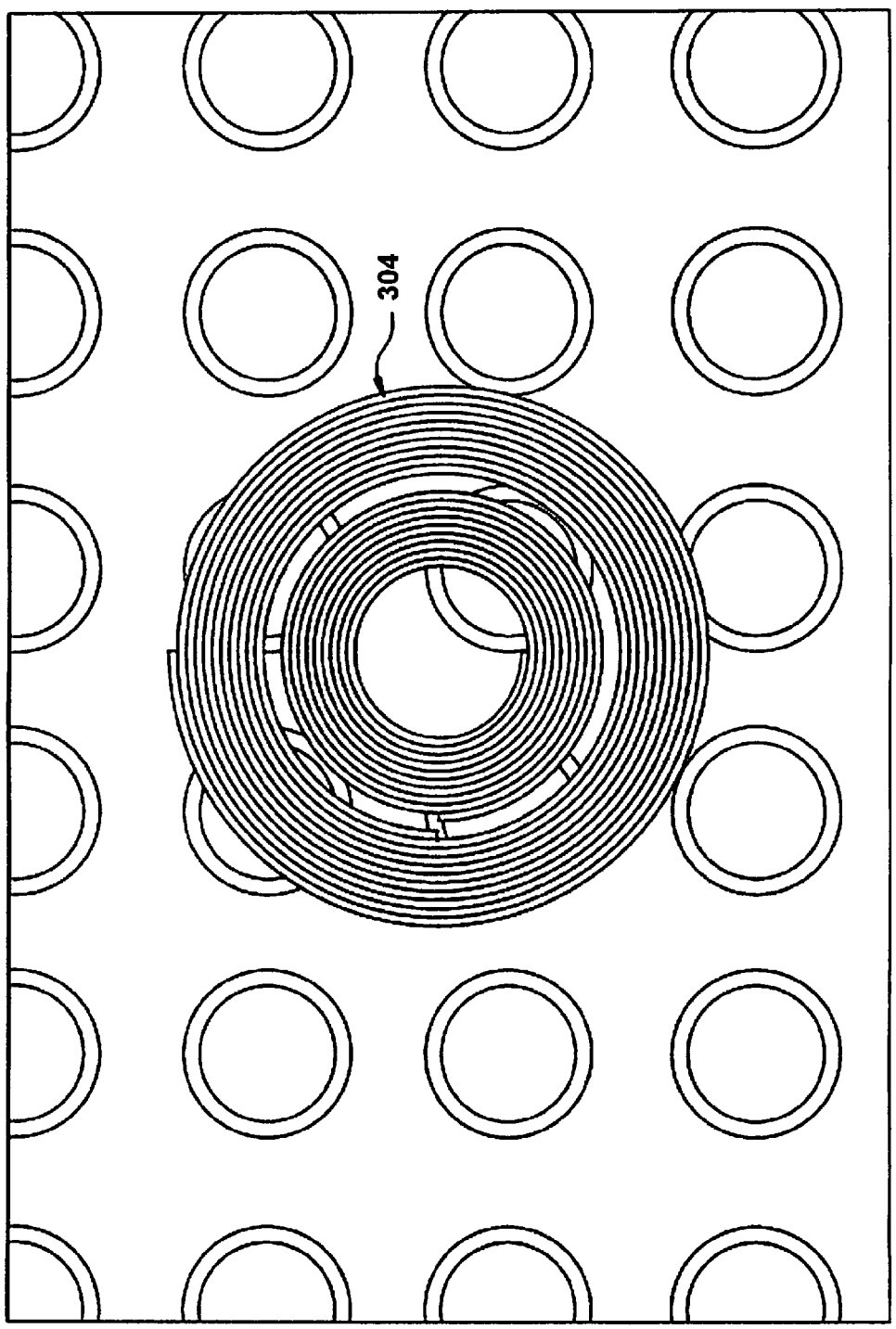
FIG. 5 is a schematic diagram illustrating one embodiment of receiving inductive units for an apparatus for multicoil telemetry.

FIG. 4 illustrates on embodiment of driving inductive unit 302 and first intermediate inductive unit 306. In the depicted embodiment, the driving inductive unit 302 and first intermediate inductive unit 306 are concentric coils. FIG. 5 shows an embodiment of receiving inductive unit 304. A receiving coil may be constructed in any manner which allows for the reception of magnetic field energy. Materials used in constructing such coils may include high conductivity material such copper, and gold. Further, such a coil may be shaped to facilitate placement in on object.

The schematic flow chart diagrams that follow are generally set forth as logical flow chart diagrams. As such, the depicted order and labeled steps are indicative of one embodiment of the present disclosure. Other steps and methods may be employed that are equivalent in function, logic, or effect to one or more steps, or portions thereof, of the illustrated method. Additionally, the format and symbols employed are provided to explain logical steps and should be understood as not limiting the scope of an invention. Although various arrow types and line types may be employed in the flow chart diagrams, they should be understood as not limiting the scope of the corresponding method. Indeed, some arrows or other connectors may be used to indicate only the logical flow of the method. For instance, an arrow may indicate a waiting or monitoring period of unspecified duration between enumerated steps. Additionally, the order in which a particular method occurs may or may not strictly adhere to the order of the corresponding steps shown.

Figure 6:
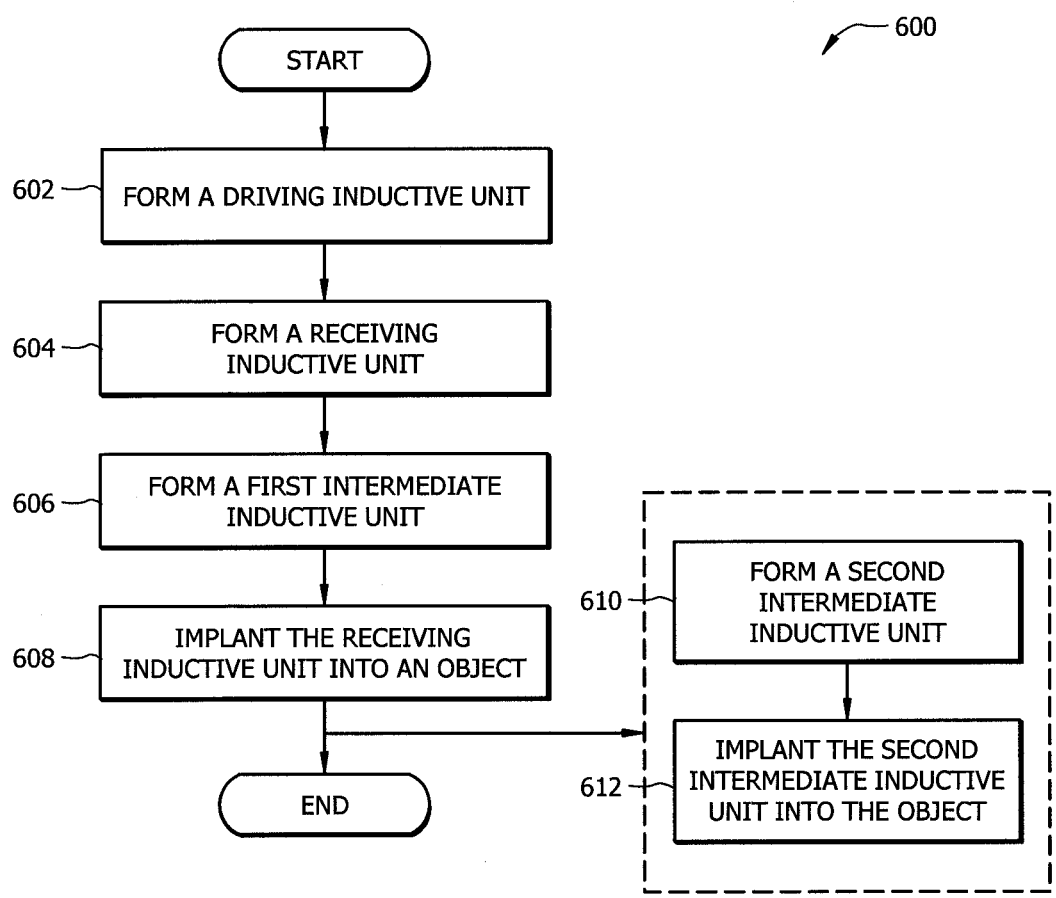
FIG. 6 is a schematic flowchart illustrating one embodiment of a method for multicoil telemetry.

FIG. 6 illustrates one embodiment of a method 600 for multicoil telemetry. In one embodiment, the method 600 may include forming driving inductive unit at 602. The driving inductive unit may be connected to an electric source, and generate an alternating magnetic field. The method 600 may also include forming receiving inductive unit at 604. The receiving inductive unit may be configured to capture the alternating magnetic field generated by the driving inductive unit and generate a voltage output. The method 600 may further include forming a first intermediate inductive unit at 606. In one embodiment, the first intermediate inductive unit may include materials with a high Q-factor. The first intermediate inductive unit may be configured to alter the magnetic field to optimize the coupling efficiency between the driving inductive unit and the receiving inductive unit, such as discussed above with respect to FIGS. 3A-3B. The first intermediate inductive unit may also be configured to decouple the resistance of the driving inductive unit and the receiving inductive unit, such that the combination may achieve a high Q-factor, such as discussed above with respect to FIGS. 3A-3B. In one embodiment, the method 600 may further include implanting the receiving inductive unit in an object at 608. The object may be a human body, an animal or other organism. The object may also be a machine, a robot, an electronic device, or the like.

In a more detailed embodiment, the method 600 may further include forming a second intermediate inductive unit at 610. In one embodiment, the second intermediate inductive unit may include materials with a high Q-factor. The second intermediate inductive unit may be configured to alter the magnetic field to optimize the coupling efficiency between the driving inductive unit and the receiving inductive unit. The second intermediate inductive unit may also be configured to decouple the resistance of the driving inductive unit and the receiving inductive unit, such that the combination may achieve a high Q-factor, such as discussed above with respect to FIGS. 3A-3B. In one embodiment, the method 600 may further include implanting the second intermediate inductive unit in the object in which the receiving inductive unit is implanted at 612.

The following description discusses in more detail example results obtained from implementing embodiments, such as described above, in an experimental setting. It is noted that the following is presented by way of example and that various modifications may be made based on the types of equipment being utilized, particular applications, and the like. Such modifications are considered within the scope of the novel concepts described in the present application.

Multicoil Model

Multi-coil apparatuses for power and/or data transfer are compared to traditional 2-coil based wireless power and/or data transfer system. For applications where implanted coils are in use and cannot be replaced, a 3-coil based system, such as the apparatus 300 shown in FIG. 3A, may be utilized. To analyze the multi-coil systems performance, systems may be modeled into simplified topologies based on network theory and circuit theory. Each of the models may have its advantages over the other to characterize the system.

A. Network Model

Network model may be based on Kirchoff voltage model for each coil. It uses voltage sources as forcing function and calculates the current ($I_n$, $n \in \{2, 3, 4\}$) in each coil as a function of self and mutual impedance of the coils. Equations 1, 2 and 3 shown below formulate the current in each coils for 2-coils, 3-coils and 4-coil based system, respectively.

2-Coil:

$$\begin{bmatrix} I_1 \\ I_2 \end{bmatrix} = \begin{bmatrix} Z_{11} & Z_{12} \\ Z_{21} & Z_{22} \end{bmatrix}^{-1} \begin{bmatrix} V_1 \\ 0 \end{bmatrix} \quad (1)$$

3-Coil:

$$\begin{bmatrix} I_1 \\ I_2 \\ I_3 \end{bmatrix} = \begin{bmatrix} Z_{11} & Z_{12} & Z_{13} \\ Z_{21} & Z_{22} & Z_{23} \\ Z_{31} & Z_{32} & Z_{33} \end{bmatrix}^{-1} \begin{bmatrix} V_1 \\ 0 \\ 0 \end{bmatrix} \quad (2)$$

4-Coil:

$$\begin{bmatrix} I_1 \\ I_2 \\ I_3 \\ I_4 \end{bmatrix} = \begin{bmatrix} Z_{11} & Z_{12} & Z_{13} & Z_{14} \\ Z_{21} & Z_{22} & Z_{23} & Z_{24} \\ Z_{31} & Z_{32} & Z_{33} & Z_{34} \\ Z_{41} & Z_{42} & Z_{43} & Z_{44} \end{bmatrix}^{-1} \begin{bmatrix} V_1 \\ 0 \\ 0 \\ 0 \end{bmatrix} \quad (3)$$

Equation 4 below provides the impedance (self and mutual) models of the coils.

$$Z_{mn} = Z_{nm} = R_n + j\omega L_n + \frac{1}{j\omega C_n} \quad \text{for } m = n \quad (4)$$
$$= j\omega M_{mn} \quad \text{for } m \neq n$$
$$M_{mn} = k_{mn}\sqrt{L_m L_n}$$

Based on network model, equation 5 below can be used to calculate the input, output power, power transfer efficiency and voltage gain of the power transfer system.

$$P_{in} = |V_1||I_1| \quad (5)$$
$$P_{out}|_n = |V_n||I_n| = \frac{|I_n|^2}{R_n}; n \in \{2, 3, 4\}$$
$$\eta = P_{out}|_n / P_{in}$$
$$\text{Gain} = (|I_n|R_n)/|V_1|$$

B. Two-Port Model

Figure 7:
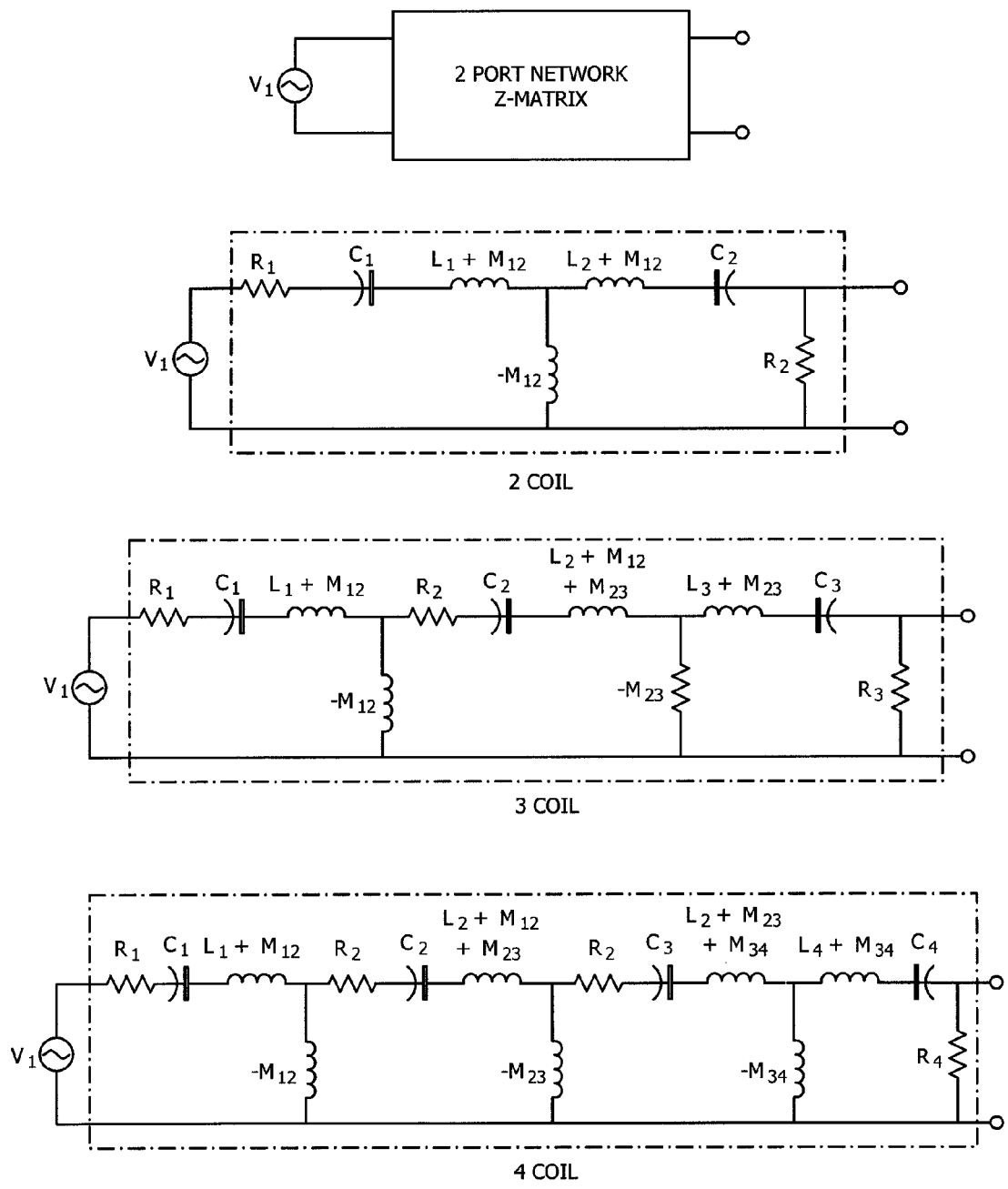
FIG. 7 is a schematic diagram illustrating a two-port model according to one embodiment of multicoil telemetry system.

Two port equivalent model is a useful method to characterize the system performance with experiments. FIG. 7 shows the two port equivalent of 2-coil and multi-coil systems using lumped element components.

Similarly for two-port model, equation 6 below can be used to calculate the input, output power, power transfer efficiency to load and voltage gain of the 2-coil and multi-coil systems.

$$P_{in} = V_1^2 / |Z_{11(ef\ f)}| \quad (6)$$
$$P_{out}|_n = \frac{|Z_{21(ef\ f)}|^2 V_1^2}{R_n |Z_{11(ef\ f)}|^2}$$
$$\eta = \frac{|Z_{12(ef\ f)}|^2}{R_n |Z_{11(ef\ f)}|^2}; n \in (2, 3, 4)$$
$$\text{Gain} = \frac{|Z_{12(ef\ f)}|}{|Z_{11(ef\ f)}|}$$

Figure 8:
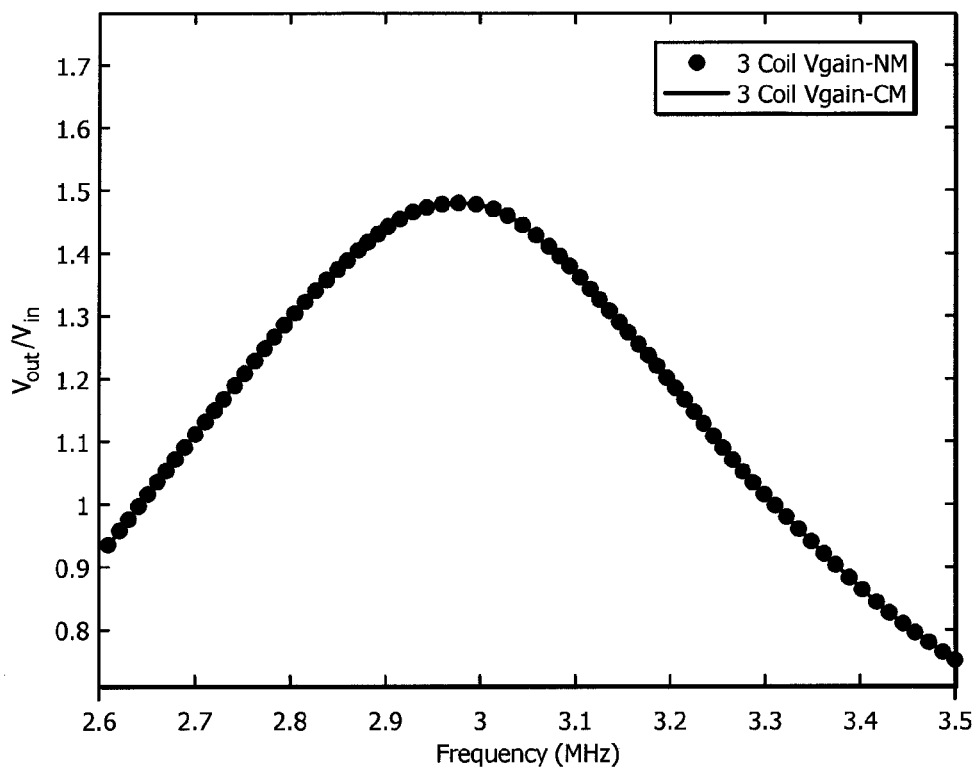
FIG. 8 is a schematic diagram illustrating the simulated voltage gain of one embodiment of multicoil telemetry system.
Figure 9:
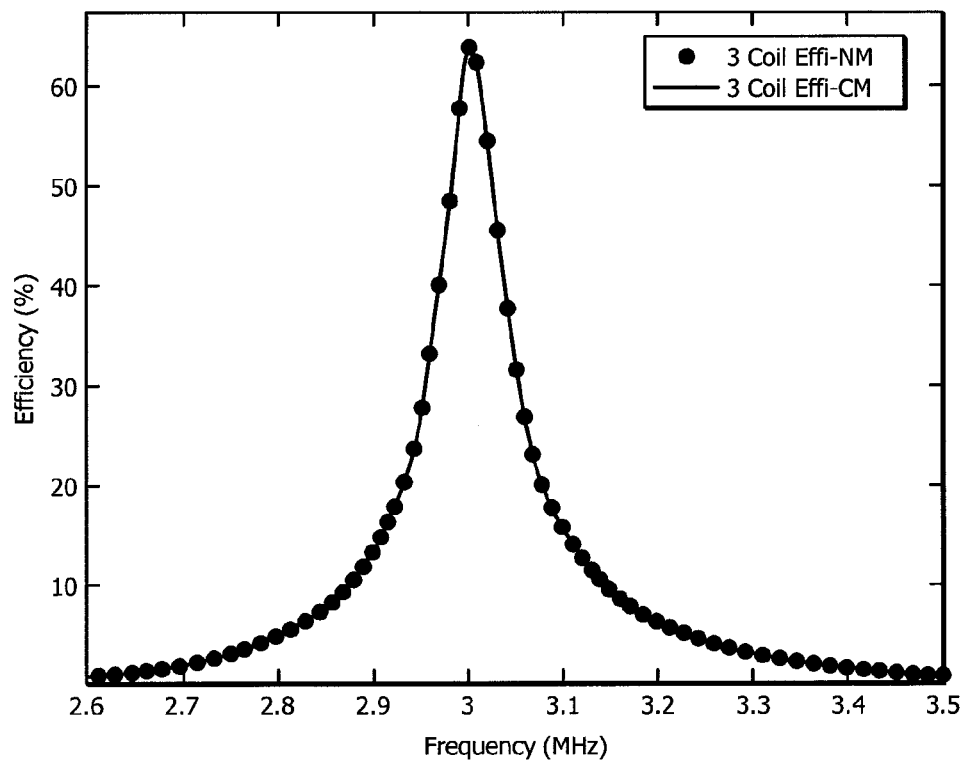
FIG. 9 is a schematic diagram illustrating the simulated efficiency of one embodiment of multicoil telemetry system.

Network model and two-port model can be used to calculate the basic performance matrix (efficiency, voltage gain, bandwidth) for power transfer systems. Network model is more generalized and can include the coupling effect between each coil in a more simple manner. Network model can provide information about current in each coil while it is more simple to characterize the two-port model of the system experimentally. Using network analyzer, S-parameters of a 2-port equivalent system can be measured, which can be converted to Z-parameters to calculate system efficiency and gain. FIGS. 8-9 show the simulated voltage gain and efficiency of 3-coil based systems using network model and two-port equivalent, respectively. The results validate the equivalence between both the models.

Power Transfer Efficiency

Using network model of 2-coil and multi-coil systems, resonance frequency, power transfer efficiency can be calculated as shown in the equations 7, 8 and 10 shown below. For a given operating distance and coil dimensions, coupling between the coils can be optimized to its maximum values as shown in previous literature. To improve the power transfer efficiency Q-factor of the coils may be maximized.

A. 2-Coil

For 2-coil systems, with given load condition and source resistance, quality factors of the driver and receiving inductive unit are moderate values which restrict the efficiency to low values less than 40%.

$$\eta = \frac{k^2 Q_d Q_l}{1 + k^2 Q_d Q_l} \quad (7)$$

B. 3-Coil

To decouple the source resistance from the quality factor of first intermediate inductive unit, the driving inductive unit of 2-coil based systems can be divided into two parts called, driving and first intermediate inductive units. The first intermediate inductive unit may have a high inductance comparing to the driving inductive unit and at tuned operating frequency it can achieve high quality factor ($Q_t$). Due to low inductance and moderate source resistance (5Ω), driving inductive unit may have a low quality factor ($Q_d$). Driving and first intermediate inductive units are strongly coupled ($k_1$~0.5) and hence power transfer between the driving inductive unit to the first intermediate inductive unit may be efficient. While for a given operating distance (fixed $k_2$), power transfer efficiency between the first intermediate inductive unit and receiving inductive unit may be improved due to high quality factor of first intermediate inductive unit ($Q_t$).

$$\eta = \frac{k_1^2 Q_d Q_t}{1 + k_1^2 Q_d Q_t + k_2^2 Q_t Q_l} \frac{k_2^2 Q_t Q_l}{1 + k_2^2 Q_t Q_l} \quad (8)$$

for $(1+k_1^2 Q_d Q_t) \gg k_2^2 Q_d Q_l$, equation 8 can be approximated as equation 9.

$$\eta \simeq \frac{k_1^2 Q_d Q_t}{1 + k_1^2 Q_d Q_t} \frac{k_2^2 Q_t Q_l}{1 + k_2^2 Q_t Q_l} = \eta_{12}\eta_{23} \quad (9)$$

C. 4-Coil 4-coil based power transfer systems are extensions of 3-coil systems in which objects are implanted can be modified and implantable inductive units can be subdivided to two units called second intermediate inductive unit and receiving inductive unit. This method may decouple the quality factor of receiving inductive unit from high load resistance. Similarly energy can be efficiently transferred between the second intermediate inductive unit and receiving inductive unit. For same dimensions of implanted and outer units, 4-coil based system can achieve higher efficiency compare to its 2-coil and 3-coil equivalent due to high quality factor of first and second intermediate inductive units.

$$\eta = \frac{(k_1^2 Q_d Q_t)(k_3^2 Q_r Q_l)}{(1+k_1^2 Q_d Q_t)(1+k_3^2 Q_r Q_l)+k_2^2 Q_t Q_r} \frac{k_2^2 Q_t Q_r}{1+k_2^2 Q_t Q_r + k_3^2 Q_r Q_l} \quad (10)$$

For $\eta=(1+k_1^2 Q_d Q_t)(1+k_3^2 Q_r Q_l)\gg k_2^2 Q_t Q_r$ and $(1+k_2^2 Q_t Q_r)\gg k_3^2 Q_r Q_l$, equation 10 can be approximated as equation 11.

$$\eta \simeq \frac{k_1^2 Q_d Q_t}{1+k_1^2 Q_d Q_t} \frac{k_2^2 Q_t Q_r}{1+k_2^2 Q_t Q_r} \frac{k_3^2 Q_r Q_l}{1+k_3^2 Q_r Q_l} = \eta_{12}\eta_{23}\eta_{34} \quad (11)$$

Voltage Gain

For wireless power transfer, voltage gain is an important design parameter to achieve a sufficient voltage level to operate the implanted device reliably. Voltage gain ($V_{out}/V_{in}$) is a function of coupling and coil quality factors. Equations 12, 14 and 16 below show the voltage gain of 2-coil, 3-coil and 4-coil based systems, respectively.

A. 2-Coil

Using network model of 2-coil systems, voltage gain can be formulated as equation 12.

$$G_2 = j\sqrt{\frac{R_2}{R_1}} \frac{k\sqrt{Q_d Q_t}}{1+k^2 Q_d Q_t} \quad (12)$$

For nominal coupling (k~0.05 for implanted devices) and moderate Q-factor of coils ($Q_d$, $Q_l$), $k2Q_d Q_l \ll 1$ and hence the gain of 2-coil based system can be approximated as equation 13.

$$G_2 \sim j\sqrt{\frac{R_2}{R_1}} k\sqrt{Q_d Q_t} = g_{12} \quad (13)$$

B. 3-Coil

Similarly at resonance frequency voltage gain of 3-coil based systems can be calculated using equation 14.

$$G_3 = \sqrt{\frac{R_3}{R_1}} \frac{(k_1\sqrt{Q_d Q_t})(k_2\sqrt{Q_t Q_l})}{1+k_1^2 Q_d Q_t + k_2^2 Q_t Q_l} \quad (14)$$

For high coupling $k_1$, and $Q_l$ for 3-coil system, $k_1^2 Q_d Q_t \gg 1+k_2^2 Q_t Q_l$ and gain can be approximated as equation 15.

$$G_3 \sim -\sqrt{\frac{R_3}{R_1}} k_2 \sqrt{Q_t Q_l} \frac{1}{k_1\sqrt{Q_d Q_t}} = g_{23}\frac{1}{g_{12}} \quad (15)$$

C. 4-Coil

Voltage gain for 4-coil based systems is shown as equation 16.

$$G_4 = j\sqrt{\frac{R_4}{R_1}} \frac{(k_1\sqrt{Q_d Q_t})(k_2\sqrt{Q_t Q_r})(k_3\sqrt{Q_r Q_l})}{(1+k_1^2 Q_d Q_t)(1+k_3^2 Q_r Q_l)+k_2^2 Q_t Q_r} \quad (16)$$

For high coupling $k_1$, $k_3$ and high Q-factor coils ($Q_t$, $Q_r$), $(1+k_1^2 Q_d Q_t)(1+k_3^2 Q_r Q_l) \gg k_2^2 Q_t Q_r$ and voltage gain can be approximated as equation 17.

$$G_4 \sim -j\sqrt{\frac{R_2}{R_1}} k_2\sqrt{Q_t Q_r} \frac{1}{k_1\sqrt{Q_d Q_t}} \frac{1}{k_3\sqrt{Q_r Q_l}} = g_{23}\frac{1}{g_{12}}\frac{1}{g_{34}} \quad (17)$$

Figure 10:
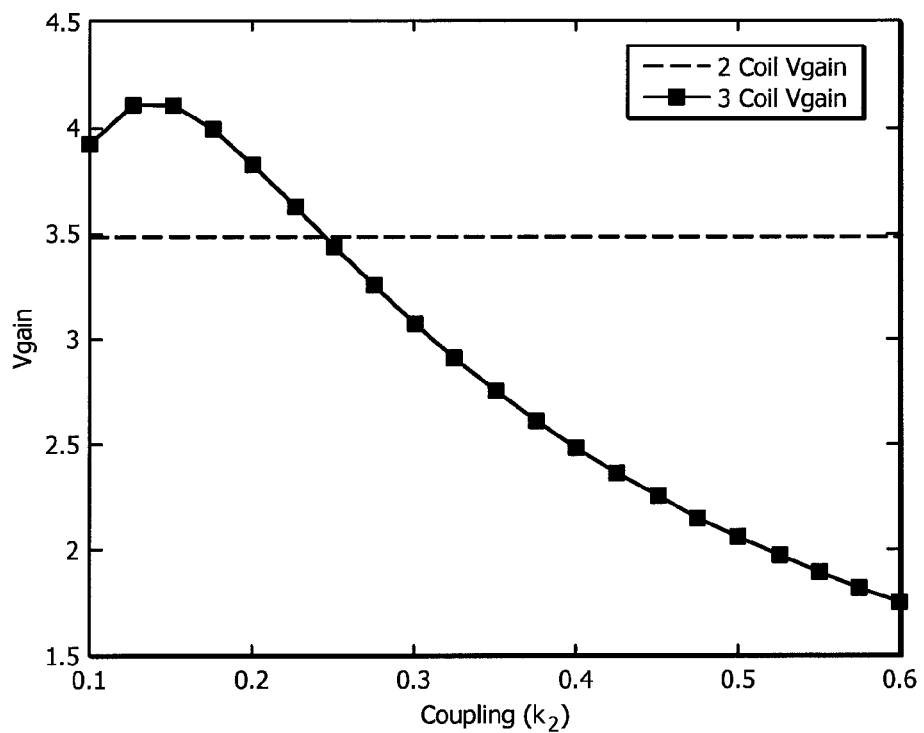
FIG. 10 is a schematic diagram illustrating the simulated change in voltage gain with respect to coupling factor, according to one embodiment of multicoil telemetry system.

Approximated model of voltage gain is useful to visualize the effect of dominant parameters of voltage gain and comparison between the voltage gain of 2-coil, 3-coil and 4-coil systems. Multicoil systems provide more parameters for designer to tune the desired voltage gain for given design constraints. FIG. 10 shows the change in 3-coil system voltage gain with respect to coupling $k_1$ which concludes that for high coupling ($k_1$), voltage gain of 3-coil systems is lesser than the 2-coil equivalent but with moderate coupling, $G_3$ is higher than $G_2$.

Data Bandwidth

Figure 11:
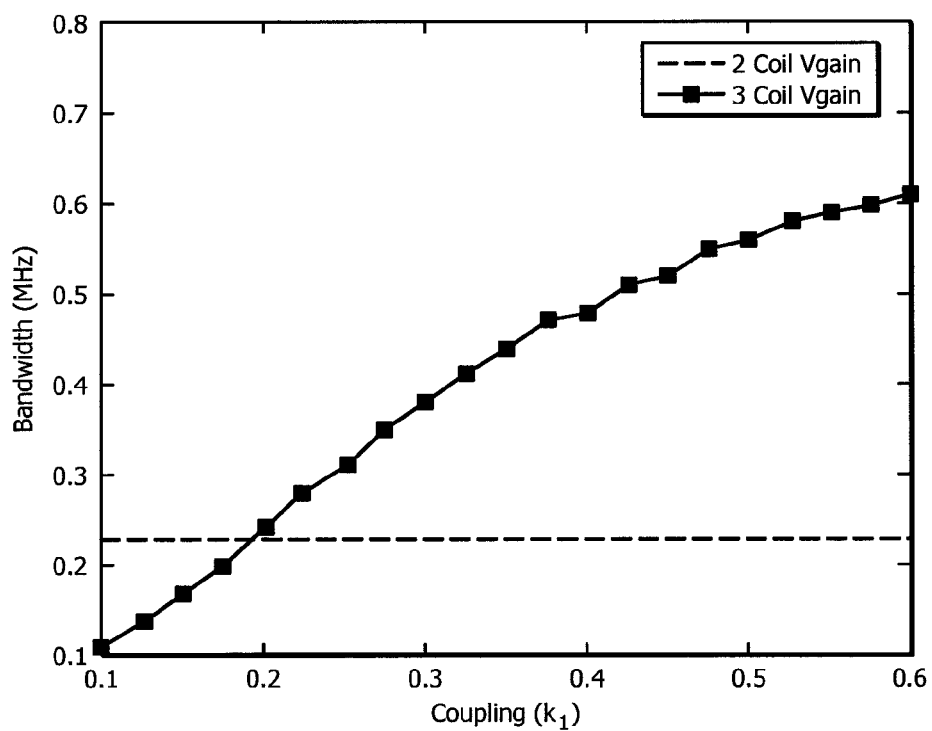
FIG. 11 is a schematic diagram comparing the data bandwidth performance of one embodiment of multicoil telemetry system to its 2-coil equivalent.

In telemetry applications, moderate data bandwidth is essential to send control/vital sign signals to/from the implanted devices. For two resonating oscillators, data bandwidth is directly proportional to coupling between the oscillators. Couple mode theory was used to explain the phenomenon of pole splitting due to coupling between resonating objects. Higher coupling causes higher pole splitting and hence higher bandwidth. For a given operating distance fixed coupling k (or $k_2$), bandwidth of 2-coil is fixed. Multicoil systems use high coupling between driving inductive unit to first intermediate inductive unit ($k_1$) (and/or receiver to receiving inductive unit ($k_3$)) to improve the data bandwidth compared to 2-coil equivalent systems for given operating distance. FIG. 11 shows that for given operating distance ($k_2$) and high coupling ($k_1$>0.2), available bandwidth for 3-coil based systems is higher than its 2-coil equivalent. Due to strong coupling, bandwidth increases with the increase in coupling $k_1$.

Figure 12:
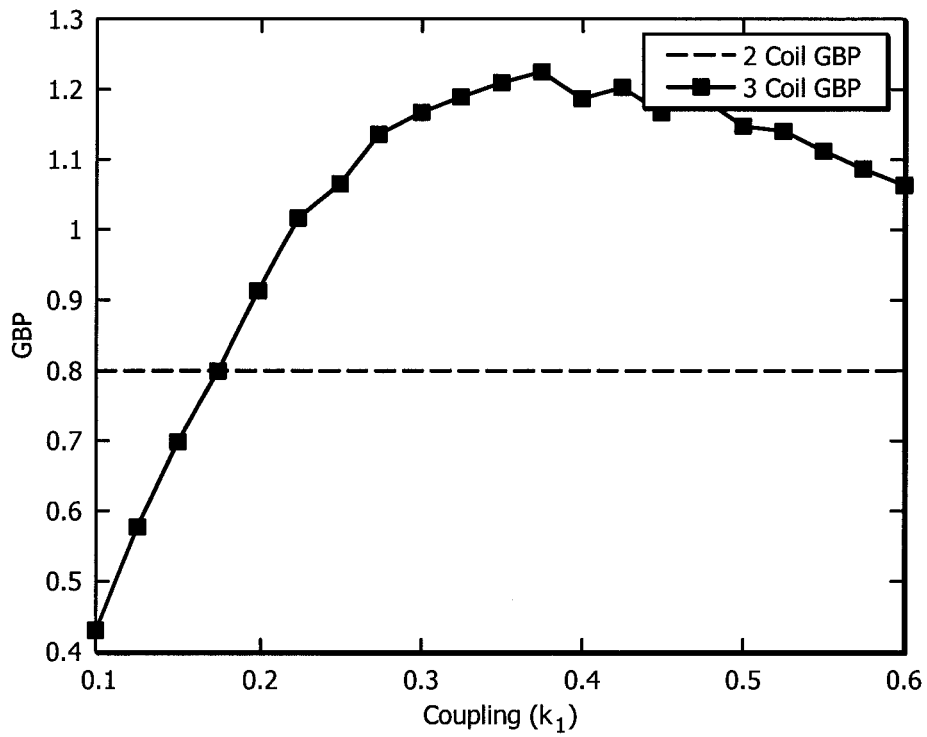
FIG. 12 is a schematic diagram comparing the gain-bandwidth performance of one embodiment of multicoil telemetry system to its 2-coil equivalent.

Increasing coupling factor $k_1$ reduces the voltage gain and increases the available data bandwidth of the system. FIG. 12 shows that above moderate coupling ($k_1$>0.25), gain-bandwidth product is constant and higher than its 2-coil equivalents. It provides the design trade-off to tune the gain and bandwidth based on design requirements.

Design Tolerance

For practical designs, during device operation coil distance between external and implantable coil can vary from its nominal values and cause decay in coupling between coils. Hence wireless power links should compensate the change in coupling (k or $k_2$). Some implantable devices have different operating mode and hence reflect different load to the receiving inductive unit. Hence power transfer link performance (efficiency, voltage gain and bandwidth) should be less susceptible to device operation range and device operation mode.

A. Efficiency with Respect to Coil Distance

To formulate the variation in power transfer efficiency with respect to coil distance variation (coupling k or $k_2$), rate of change in efficiency for 2-coil, 3-coil and 4-coil systems are shown by equations 18, 19 and 20 below, respectively. Due to high quality factors of first and second intermediate inductive units, multicoil system efficiency has lower rate of change compared to 2-coil equivalent.

2-Coil:

$$\frac{1}{\eta}\frac{\partial \eta}{\partial k} = \frac{2}{k(1+k^2 Q_d Q_l)} \quad (18)$$

3-Coil:

$$\frac{\partial \eta}{\partial k_2} = \eta_{12}\frac{\partial \eta_{23}}{\partial k_2} \quad (19)$$

-continued $$\frac{1}{\eta}\frac{\partial \eta}{\partial k_2} = \frac{2}{k_2(1+k_2^2 Q_t Q_l)}$$

4-Coil:

$$\frac{\partial \eta}{\partial k_2} = \eta_{12}\eta_{34}\frac{\partial \eta_{23}}{\partial k_2} \quad (20)$$

$$\frac{1}{\eta}\frac{\partial \eta}{\partial k_2} = \frac{2}{k_2(1+k_2^2 Q_t Q_r)}$$

Figure 13:
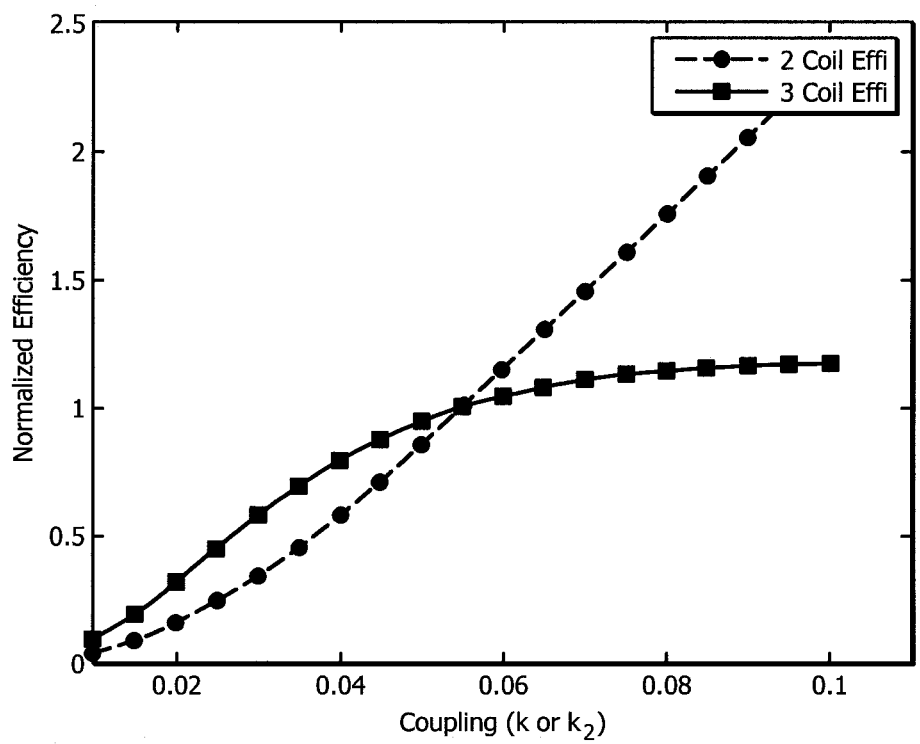
FIG. 13 is a schematic diagram illustrating the change in efficiency with variation in coupling between coils according to one embodiment of multicoil telemetry system.

FIG. 13 shows the change in efficiency (normalized for k (or $k_2$)=0.055) with variation in coupling between inductive units. It can be seen that for nominal operating range (k∈[0.04, 0.07]), 3-coil based systems have lower variation in efficiency.

B. Voltage Gain with Respect to Coil Distance

To ensure the reliable device operation, voltage variation at device input should be smaller with change in operating distance changes. With changes in coupling between external and implanted inductive units, equations 21, 22 and 23 below formulate the voltage gain variation for 2-coil, 3-coil and 4-coil systems, respectively.

2-Coil:

$$\frac{\partial G}{\partial k} = j\sqrt{\frac{R_2}{R_1}}\sqrt{Q_d Q_t} \quad (21)$$

3-Coil:

$$\frac{\partial G}{\partial k_2} = \frac{1}{g_{12}}\frac{\partial g_{23}}{\partial k_2} \quad (22)$$

$$= -\frac{1}{k_1 \sqrt{Q_d Q_t}}\sqrt{\frac{R_3}{R_1}}\sqrt{Q_t Q_l}$$

4-Coil:

$$\frac{\partial G}{\partial k_2} = g_{12}g_{34}\frac{\partial g_{23}}{\partial k_2} \quad (23)$$

$$= -j\frac{1}{k_1\sqrt{Q_d Q_1}}\frac{1}{k_3\sqrt{Q_r Q_l}}\sqrt{\frac{R_4}{R_1}}\sqrt{Q_t Q_r}$$

$$\frac{1}{G_n}\frac{\partial G}{\partial k_2} = \frac{1}{k_2}; n \in \{2,3,4\} \quad (24)$$

Figure 14:
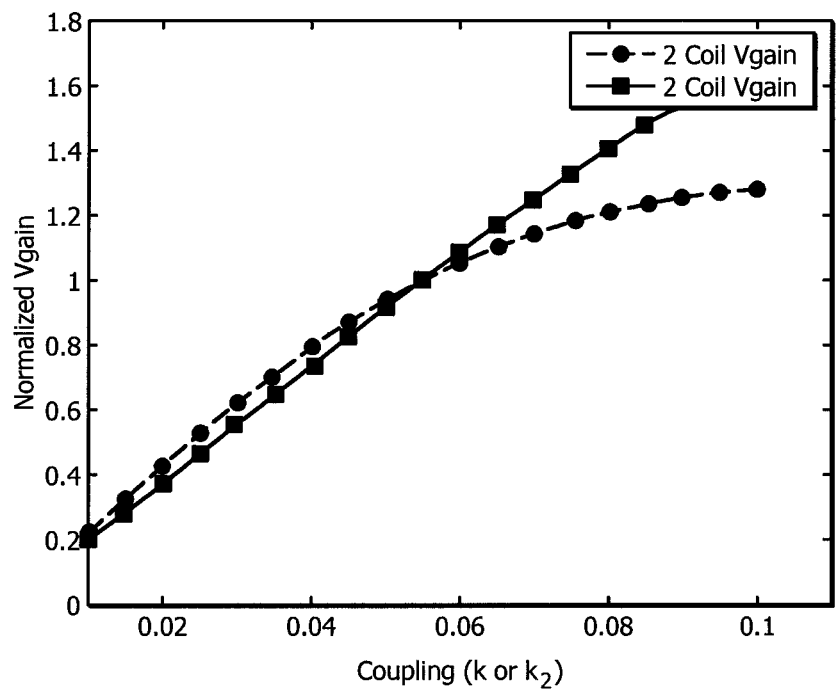
FIG. 14 is a schematic diagram comparing the voltage gain tolerance with respect to coil distance variation of one embodiment of multicoil telemetry system to its 2-coil equivalent.

From FIG. 14, it can be seen that the 2-coil and 3-coil systems show similar voltage gain tolerance with coil distance variations, as expected from equation 24.

C. Available Data Bandwidth with Respect to Coil Distance

Figure 15:
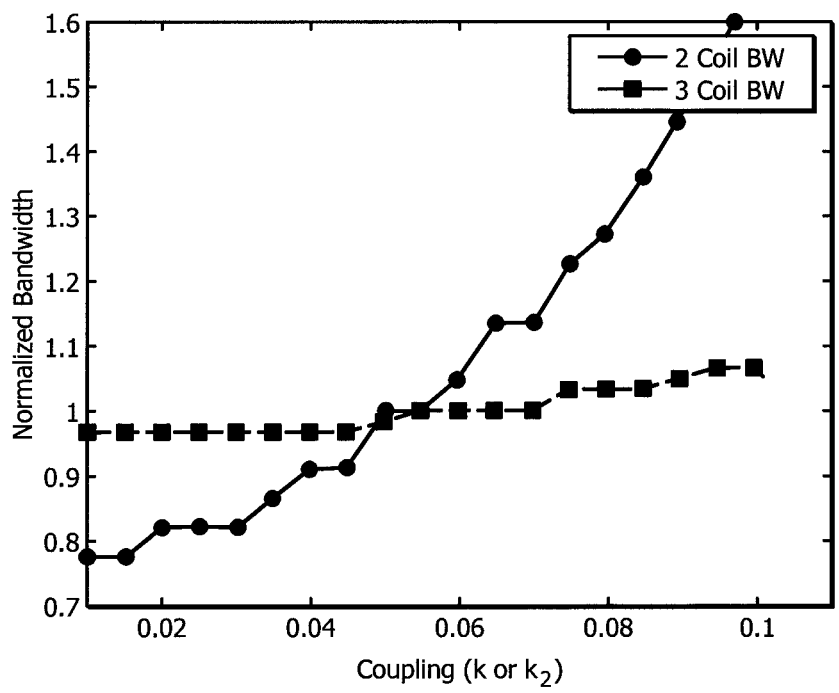
FIG. 15 is a schematic diagram comparing the bandwidth variation of one embodiment of multicoil telemetry system to its 2-coil equivalent.

For telemetry application, to keep the sufficient data bandwidth with distance variation, bandwidth should be independent of coupling k (or $k_2$). In multicoil systems, due to high coupling between driver and first intermediate inductive unit (or second intermediate and receiving inductive unit, bandwidth is dominantly governed by the $k_1$ (or $k_3$). With change in the coupling k (or $k_2$), multi-coil system shows small variation in bandwidth. FIG. 15 shows the bandwidth variation (normalized for k (or $k_2$)=0.055) for 3-coil and 2-coil systems which depicts that for 3-coil bandwidth remains almost constant with changes in distance between inductive units.

D. Efficiency with Respect to Source Resistance 2-coil based systems' efficiency is a strong function of source resistance. Due to decoupling of source resistance from first intermediate inductive unit, multicoil shows lower dependence of efficiency on source resistance variation. Equations 25, 26 and 27 show the variation of efficiency with respect to source resistance ($R_1$) for 2-coil, 3-coil and 4-coil systems, respectively.

2-Coil:

$$\frac{\partial \eta}{\partial R_1} = -\frac{1}{R_1}\frac{k^2 Q_d Q_1}{(1+k^2 Q_d Q_l)^2} \quad (25)$$

$$\frac{1}{\eta}\frac{\partial \eta}{\partial R_1} = -\frac{1}{R_1}\frac{1}{1+k^2 Q_d Q_l}$$

3-Coil:

$$\frac{\partial \eta}{\partial R_1} = -\frac{1}{R_1}\eta_{23}\frac{\partial \eta_{12}}{\partial R_1} \quad (26)$$

$$\frac{1}{\eta}\frac{\partial \eta}{\partial R_1} = -\frac{1}{R_1}\frac{1}{1+k_1^2 Q_d Q_t}$$

4-Coil:

$$\frac{\partial \eta}{\partial R_1} = -\frac{1}{R_1}\eta_{23}\eta_{34}\frac{\partial \eta_{12}}{\partial R_1} \quad (27)$$

$$\frac{1}{\eta}\frac{\partial \eta}{\partial R_1} = -\frac{1}{R_1}\frac{1}{1+k_1^2 Q_d Q_t}$$

Figure 16:
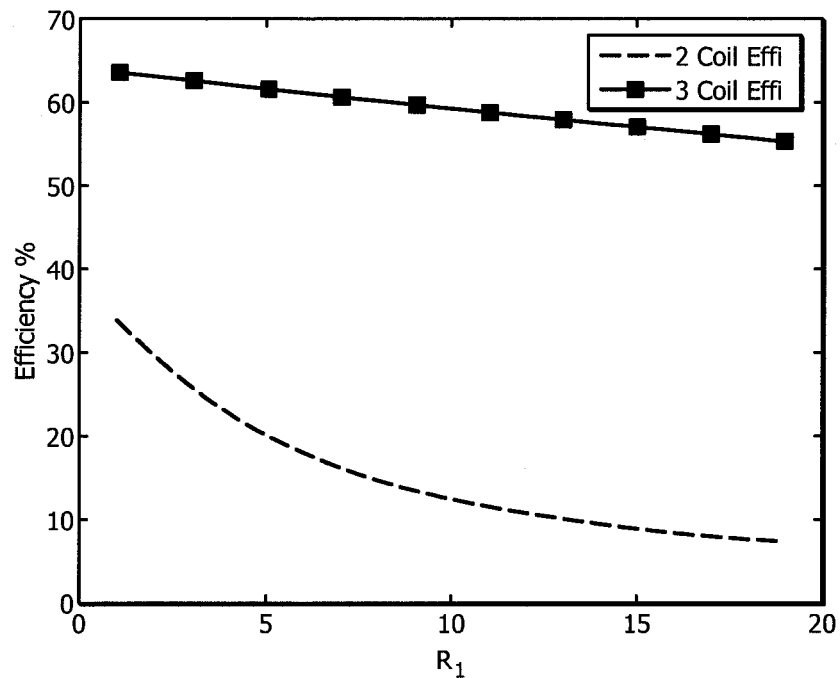
FIG. 16 is a schematic diagram comparing the changes in source resistance of one embodiment of multicoil telemetry system to its 2-coil equivalent.

FIG. 16 shows that with changes in the source resistance, 3-coil based systems' efficiency varies in small order compared to its 2-coil counterparts.

E. Efficiency with Respect to Load Resistance

During implanted device operation, based on operating mode (fully/partially active), current requirement changes, which causes change in effective load resistance on receiving inductive unit. Equations 28, 29 and 30 below show the efficiency variations with changes in load resistance, which concludes that multi-coil systems are more tolerant to load resistance variations.

2-Coil:

$$\frac{\partial \eta}{\partial R_2} = -\frac{1}{R_1}\frac{k^2 Q_d Q_l}{(1+k^2 Q_d Q_l)^2} \quad (28)$$

$$\frac{1}{\eta}\frac{\partial \eta}{\partial R_2} = -\frac{1}{R_2}\frac{1}{1+k^2 Q_d Q_l}$$

3-Coil:

$$\frac{1}{\eta}\frac{\partial \eta}{\partial R_3} = -\frac{1}{R_3}\frac{1}{1+k_2^2 Q_t Q_l} \quad (29)$$

4-Coil:

$$\frac{1}{\eta}\frac{\partial \eta}{\partial R_4} = -\frac{1}{R_4}\frac{1}{1+k_3^2 Q_r Q_l} \quad (30)$$

Figure 17:
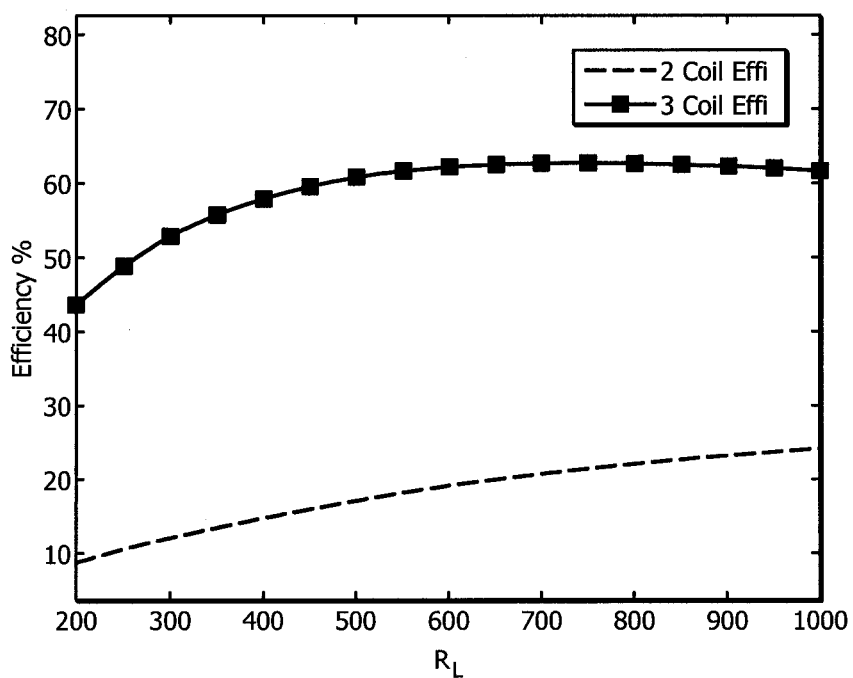
FIG. 17 is a schematic diagram comparing the changes in load resistance of one embodiment of multicoil telemetry system to its 2-coil equivalent.

FIG. 17 shows the simulated efficiency of 3-coil and 2-coil based systems with changes in load resistance. It shows that the multi-coil systems' efficiency is less susceptible to load resistance as compared to 2-coil systems.

Maximum Power Transfer

In wireless transfer system, load impedance can be seen as reflected resistance on input sources. To transfer maximum power to the load with a given input voltage, reflected impedance should be matched to source resistance. It limits the maximum power transfer efficiency to 50% as half of power is dissipated at source resistance.

A. Effective Resistance

Using network model, reflected load impedance at source can be calculated by $V_1/I_1$. Equations 31, 32 and 33 below show the total resistance seen by source due to self and input reflected load resistance in terms of coils parameters.

2-Coil:

$$R_{eff} = R_1(1 + k^2 Q_d Q_l) \quad (31)$$

3-Coil:

$$R_{eff} = R_1\left(1 + \frac{k_1^2 Q_d Q_t}{1 + k_2^2 Q_t Q_l}\right) \quad (32)$$

4-Coil:

$$R_{eff} = R_1\left(1 + \frac{k_1^2 Q_d Q_t(1 + k_3^2 Q_r Q_l)}{1 + k_2^2 Q_t Q_r + k_3^2 Q_r Q_l}\right) \quad (33)$$

$R_{eff}$ can be written as a function of loading factor N which is used to define the matching factor p as shown in equation 34. Loading factor is a positive real number, matching factor lies between 0 and 1 for all values of N, and p denotes the ratio of power delivered to maximum delivered power for given source voltage.

$$R_{eff} = R_1(1 + N) \quad (34)$$
$$p = \frac{4N}{(1+N)^2}; p \subseteq [0, 1]$$

For 2-coil, 3 coil and 4-coil systems, loading factors and resultant power transfer efficiency factors can be determined by equations 35, 36 and 37 below. For maximum power transfer, the loading factor should be 1, for which matching factor equals to 1.

For 2-coil systems, loading factor is less than 1 (~0.2-0.5). Hence, matching condition cannot be achieved for 2-coil systems.

$$N = k^2 Q_d Q_l \quad (35)$$
$$\eta = \left[1 - \frac{p}{2}\frac{1}{1+\sqrt{1-p}}\right]; \text{for } N \geq 1$$
$$\eta = \left[1 - \frac{p}{2}\frac{1}{1-\sqrt{1-p}}\right]; \text{for } N < 1$$

In 3-coil systems, for a given coupling $k_2$, loading factors can be controlled by varying $k_1$ and $Q_d$. Hence, it can easily achieve the matching factor of value 1. For example, for $k_1=0.25$, $Q_d=0.44$, $Q_t=160$, $Q_l=7$, $k_2=0.055$, loading factor and matching factor is 1 for which the power transfer efficiency is 38.6%.

$$N = \frac{k_1^2 Q_d Q_t}{1 + k_2^2 Q_t Q_l} \quad (36)$$
$$\eta = \left[1 - \frac{p}{2}\frac{1}{1+\sqrt{1-p}}\right]\eta_{23}; \text{for } N \geq 1$$
$$\eta = \left[1 - \frac{p}{2}\frac{1}{1-\sqrt{1-p}}\right]\eta_{23}; \text{for } N < 1$$

Similarly in 4-coil systems, for a given operating distance (hence fixed $k_2$), $k_1$ and $k_2$ can be used to match the load with the source for maximum power transfer.

$$N = \frac{k_1^2 Q_d Q_t(1 + k_3^2 Q_r Q_l)}{1 + k_2^2 Q_t Q_r + k_3^2 Q_r Q_l} \quad (37)$$
$$\eta = \left[1 - \frac{p}{2}\frac{1}{1+\sqrt{1-p}}\right]\eta_{23}\eta_{24}; \text{for } N \geq 1$$
$$\eta = \left[1 - \frac{p}{2}\frac{1}{1-\sqrt{1-p}}\right]\eta_{23}\eta_{24}; \text{for } N < 1$$

EXPERIMENTS

To compare the efficiency improvement due to multi-coil based systems for existing implanted devices, two well known implanted coils are used as receiving inductive units published before. Where implanted coil cannot be changed, 3-coil based systems are used. Four set of experiments were performed to distinguish the efficiency improvement for different coil types, effect of Q-factor on system efficiency, bandwidth of wireless links and efficiency tolerance with changes in coupling between external and implanted coils.

A. Experimental Setup

A 50Ω sinusoidal source is used to generate a signal at desired frequency. The efficiency is calculated from the output terminal of the signal source and a resistance of ~5.1Ω is used in series with the driving inductive unit to emulate the typical source resistance of power amplifier used for telemetry application. Table I provides the electrical and mechanical parameters for the three designs. FIG. 4 and FIG. 5 show the block diagram of concentric intermediate and driving inductive units for "Designs 1, 2, and 3." Depending on application and system constraints, the implanted coil's dimension can range from 0.5 cm to 1.5 cm. Four experiments were conducted to demonstrate the effects of high quality factor intermediate coil, and operating distance variation.

TABLE I

SYSTEM SPECIFICATIONS

| Coils | Design 1 | | Design 2 | | Design 3 | |
|---|---|---|---|---|---|---|
| | 2-coil | 3-coil | 2-coil | 3-coil | 2-coil | 3-coil |
| Driver | | | | | | |
| $D_{outD}$(cm) | 3.8 | 3.8 | 4 | 4 | 4 | 4 |
| $D_{inD}$(cm) | 1.8 | 3.6 | 2 | 3.6 | 2 | 3.6 |
| $N_D$ | 30 | 3 | 10 | 2 | 12 | 2 |
| $L_d$(μH) | 22.41 | 0.906 | 3.536 | 0.302 | 5.059 | 0.391 |
| $R_{self}$(Ω) | 3.73 | 0.507 | 0.708 | 0.164 | 0.491 | 0.164 |
| $Q_{unloaded}$ | 90.6 | 26.9 | 93.3 | 34.42 | 192.6 | 44.56 |

TABLE I-continued

SYSTEM SPECIFICATIONS

| Coils | Design 1 | | Design 2 | | Design 3 | |
|---|---|---|---|---|---|---|
| | 2-coil | 3-coil | 2-coil | 3-coil | 2-coil | 3-coil |
| $R_{driver}(\Omega)$ | 5.3 | 5.3 | 5.1 | 5.1 | 5.1 | 5.1 |
| $Q_{loaded}$ | 37.53 | 2.36 | 11.38 | 1.07 | 16.9 | 1.39 |
| Wire (AWG) | 28 | 28 | 20 | 20 | 44/100 | 44/100 |
| Transmitter | | | | | | |
| $D_{outD}(cm)$ | | 3.6 | | 3.6 | | 3.6 |
| $D_{inD}(cm)$ | | 1.3 | | 2 | | 2 |
| $N_D$ | | 27 | | 8 | | 10 |
| $L_d(\mu H)$ | | 19.01 | | 2.195 | | 3.96 |
| $R_{self}(\Omega)$ | | 3.527 | | 0.8 | | 0.3 |
| $Q_{unloaded}$ | | 81.3 | | 51.3 | | 247 |
| $R_{driver}(\Omega)$ | | — | | — | | — |
| $Q_{loaded}$ | | 81.3 | | 51.3 | | 247 |
| Wire (AWG) | | 28 | | 20 | | 44/100* |
| Opt. Dis. (mm) | 15 | 15 | 12 | 12 | 12 | 12 |
| $k_{12} = k_1$ | 0.016 | 0.47 | 0.06 | 0.45 | 0.06 | 0.6 |
| $k_{23} = k_2$ | | 0.015 | | 0.055 | | 0.058 |
| $f_{res}$ (MHz) | 2.4 | 2.4 | 2.975 | 2.975 | 2.975 | 2.975 |
| Load Type | SC* | SC | PC* | PC | PC | PC |

*SC = series load,
*PC = parallel load
*44/10—100 strands, AWG 44 Litz wire

Experiment 1

Experiment 1 was conducted using "Design 1" system parameters to compare the efficiency, gain and bandwidth of 2-coil systems and their 3-coil equivalents. Table I (column "Design 1") provides the electrical, mechanical and operating conditions of 2-coil and 3-coil systems. For fair comparison, overall mechanical dimensions of the systems were kept the same. FIG. 5 shows the schematic diagram of the implanted coils for "Designs 1, 2, and 3."

Experiment 2

Experiment 2 uses "Design 2" system parameters to compare between 2-coil systems and their 3-coil equivalents as shown in Table I (column "Design 2"). Design 2 uses the same retinal coils (implanted coil) and operating conditions (frequency and distance of operation). Partial inductance method was used to simulate the self inductance of retinal coil and its mutual inductance with external coils. FIG. 5 shows the schematic diagram of the implanted coils for "Design 1, 2 and 3.

Experiment 3

Experiment 3 was performed to design and show the effect of high quality factor first intermediate inductive unit on system efficiency. It uses the low resistance multi strand Litz wire to improve the quality factor. Table I (column "Design 3") shows the system parameters of 2-coil systems and their 3-coil equivalents. Design 3 uses the same elliptical retinal coils used for experiment 2.

Experiment 4

To ensure system performance for different operating condition, efficiency tolerance should be small. For retinal implants, due to rotation motion eye coupling between implanted and external coils changes and causes changes in the power transfer efficiency. Experiment 4 was performed to identify the efficiency tolerance of "Design 3" system with 2-coil systems and their 3-coil equivalents. FIG. 1 shows the set-up to emulate the eye ball rotation for retinal implants.

B. Experimental Results

Experiment 1

Figure 18:
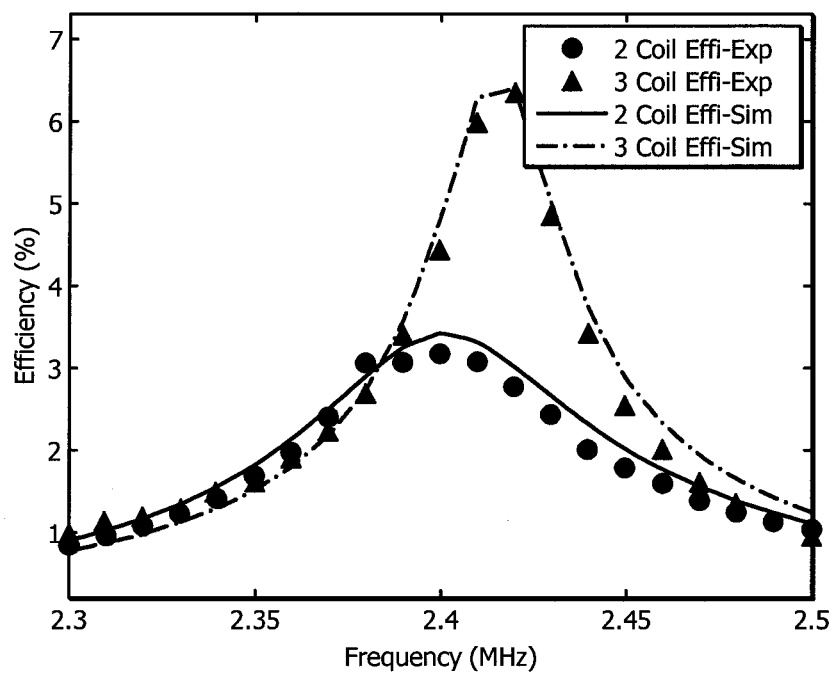
FIG. 18 is a schematic diagram comparing the simulated and measured efficiency of one embodiment of multicoil telemetry system to its 2-coil equivalent.

FIG. 18 shows the simulated and measured efficiency of 2-coil and 3-coil systems for "Design 1." 3-coil systems show more than 2 times efficiency compared to their 2-coil equivalents for same operating conditions and system dimensions.

Figure 19:
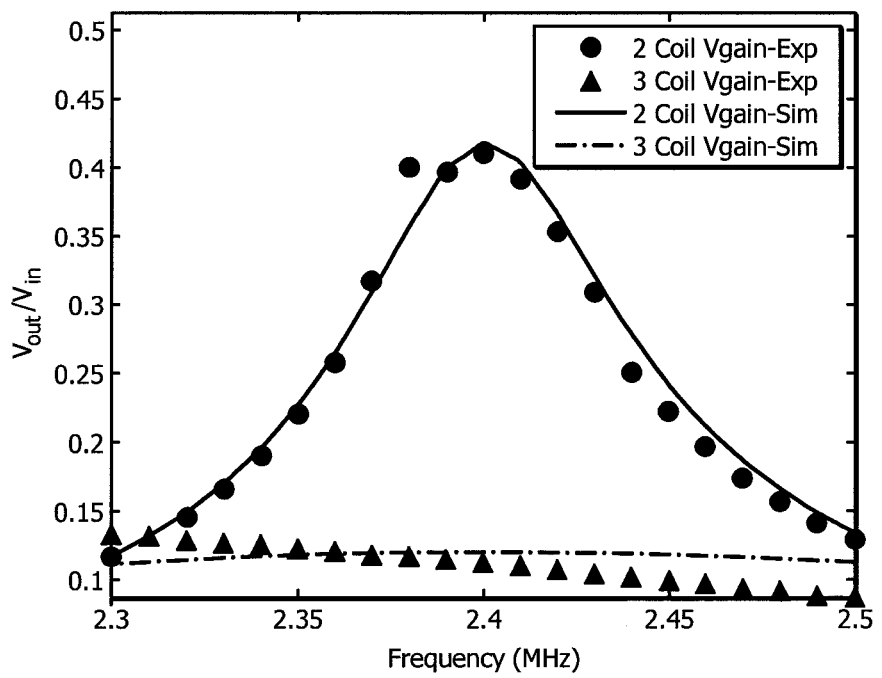
FIG. 19 is a schematic diagram comparing the simulated and measured voltage gain of one embodiment of multicoil telemetry system to its 2-coil equivalent.

FIG. 19 plots the simulated and measured voltage gain of 2-coil and 3-coil systems. Due to high coupling between driver and first intermediate inductive unit ($k_1$=0.45), 3-coil systems show higher bandwidth compared to 2-coil systems. As expected, due to high coupling ($k_1$) voltage gain of 3-coil systems is lesser than 2-coil systems.

Experiment 2

Figure 20:
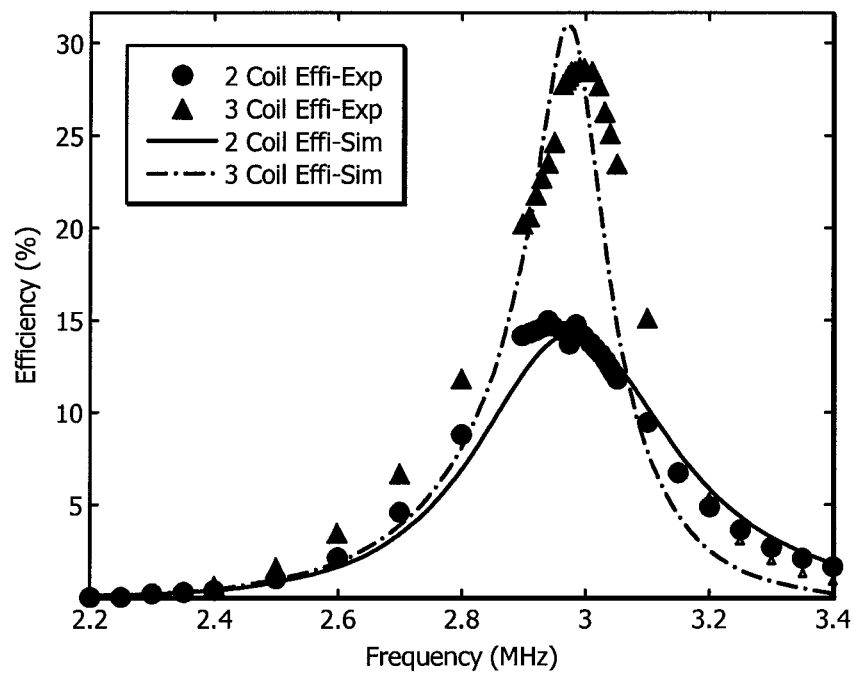
FIG. 20 is a schematic diagram comparing the simulated and measured efficiency of one embodiment of multicoil telemetry system to its 2-coil equivalent.

For retinal coil under defined operating conditions (Experiment 2), FIG. 20 shows the simulated and measured efficiency of 2-coil and 3-coil systems. For same operating conditions and system dimensions, 3-coil systems show more than 2 times efficiency compared to their 2-coil equivalents.

Figure 21:
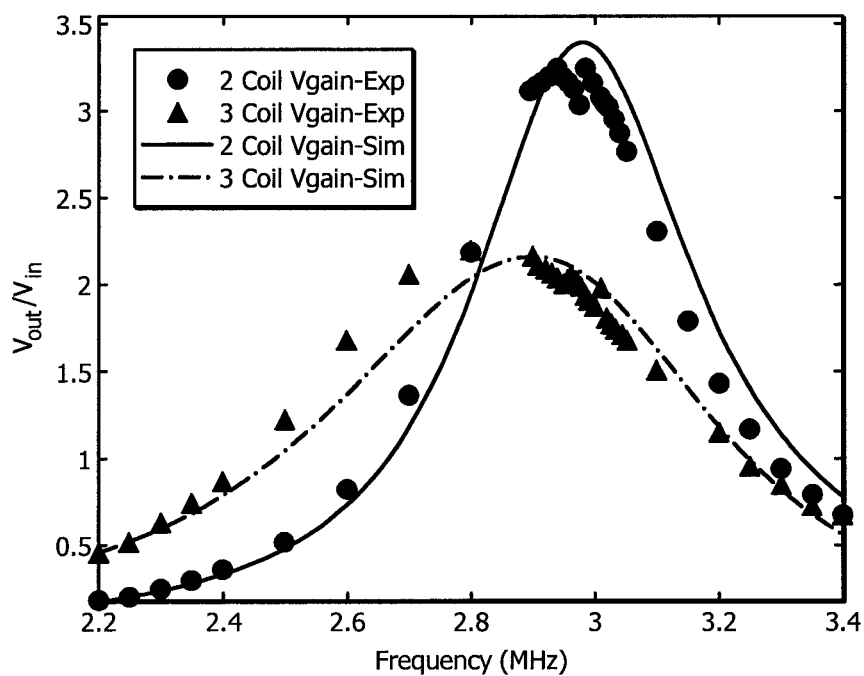
FIG. 21 is a schematic diagram comparing the simulated and measured voltage gain of one embodiment of multicoil telemetry system to its 2-coil equivalent, with a coupling factor of 0.5.

FIG. 21 plots the simulated and measured voltage gain of 2-coil and 3-coil systems. As can be seen, 3-coil systems show higher data bandwidth as compared to 2-coil systems due to high $k_1$ (e.g. 0.5).

Experiment 3

Figure 22:
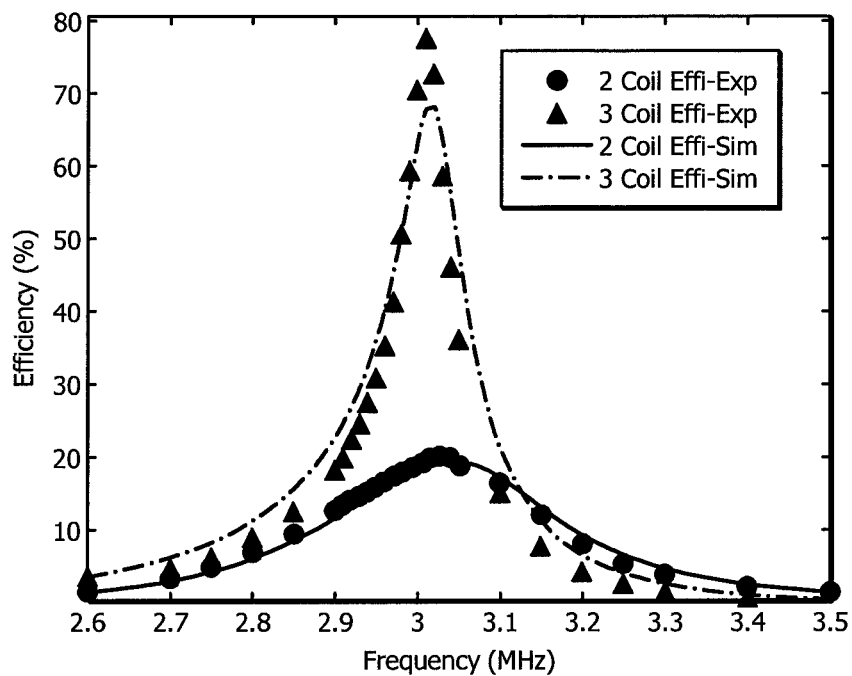
FIG. 22 is a schematic diagram comparing the simulated and measured efficiency of one embodiment of multicoil telemetry system to its 2-coil equivalent, with high Q-factor first intermediate inductive unit.

FIG. 22 plots the simulated and measured efficiency of 2-coil and 3-coil system with high Q-factor first intermediate inductive unit. For the same retinal implanted coil, using high $Q_t$, 3-coil systems achieve higher efficiency compared to Experiment 2. Using Litz-wire for the external coil of 2-coil and 3-coil systems, 3-coil systems achieve more than 2.5 times efficiency compared to their 2-coil equivalents.

Figure 23:
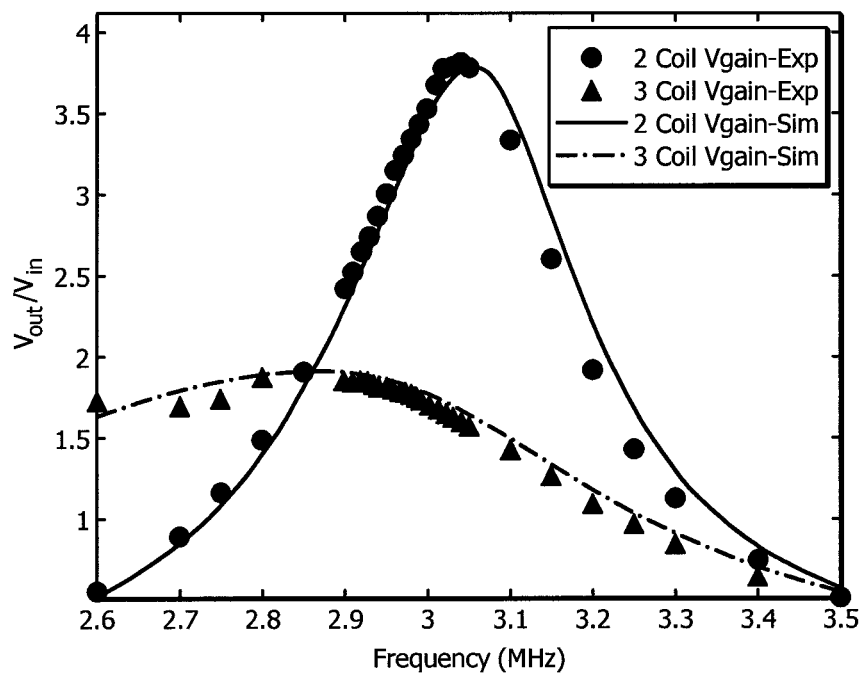
FIG. 23 is a schematic diagram comparing the simulated and measured voltage gain of one embodiment of multicoil telemetry system to its 2-coil equivalent.

FIG. 23 shows the simulated and measured voltage gain of Experiment 2 which shows that 3-coil systems can achieve higher data bandwidth than 2 coil systems.

Experiment 4

Figure 24:
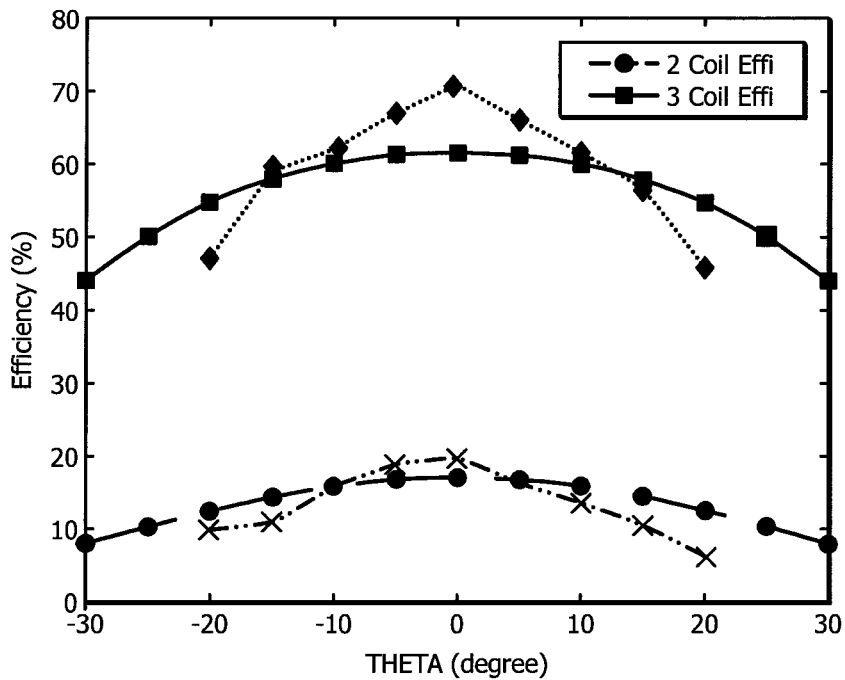
FIG. 24 is a schematic diagram comparing the simulated and measured efficiency variation with respect to coil rotation angle of one embodiment of multicoil telemetry system to its 2-coil equivalent.

To compare the tolerance of power transfer systems with change in coupling between external and implanted coil, FIG. 24 shows the simulated and experimental results for efficiency variation with respect to coil rotation angle. For 3-coil systems, due to high $Q_t$ factor of first intermediate inductive unit effect of coupling variation is compensated by $Q_t$ and hence variation is small compared to 2-coil equivalents.

Figure 25:
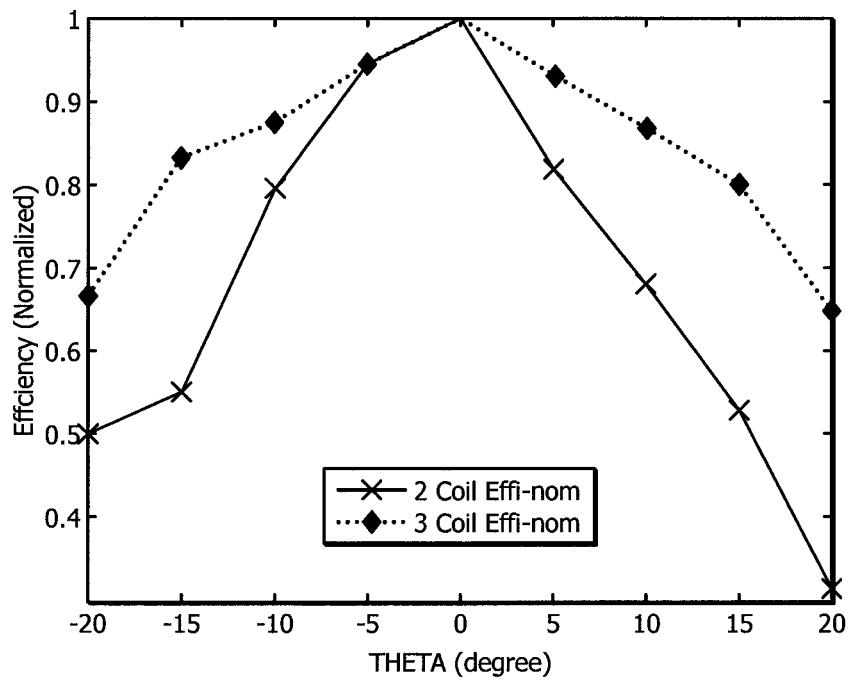
FIG. 25 is a schematic diagram comparing the normalized efficiency variation with respect to reference position (rotation angle 0°) of one embodiment of multicoil telemetry system to its 2-coil equivalent.

FIG. 25 shows the normalized efficiency of 3-coil and 2-coil systems to show that with respect to reference position (rotation angle 0°), variation of 3-coil systems' efficiency is smaller.

Comparison

For telemetry applications, to compare the system performance of 2-coil systems with their multicoil equivalents, it is helpful to define performance metrics. For wireless power and data transfer, efficiency, voltage gain, bandwidth and system dimensions may be key parameters. For many telemetry designs, voltage gain is one of design parameters, and figure of merit (FOM) is defined in equation 38. FOM is a unit-less quantity where higher value depicts the better system performance.

$$FOM = 10\text{Log}_{10}\left[\frac{d^2}{D_1 \times D_2} \frac{BW}{f_{oper}} \times \eta \times \text{Gain}\right] \quad (38)$$

Table II summarizes the performance metric of 2-coil systems and its 3-coil equivalents for all three designs. It can be seen that for all the designs, multicoil systems perform better than 2-coil systems in terms of power and data transfer.

TABLE II

RESULTS COMPARISON

| | Design 1 | | Design 2 | | Design 3 | |
|---|---|---|---|---|---|---|
| | 2-coil | 3-coil | 2-coil | 3-coil | 2-coil | 3-coil |
| η(%) | 3.12 | 6.3 | 14.8 | 28.7 | 20 | 68 |
| BW (kHz) | 60 | 332 | 280 | 480 | 230 | 540 |
| Gain | 0.42 | 0.125 | 3.39 | 2.16 | 3.78 | 1.91 |
| GBP | 25.2 | 41.5 | 949.2 | 1036.8 | 869.4 | 1031.4 |
| FOM | −34.28 | −28.8 | −18.8 | −15.6 | −18.0 | −11.9 |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a driving inductive unit, the driving inductive unit coupled to an electric source and configured to generate an alternating magnetic field; and
   an intermediate inductive unit disposed between the driving inductive unit and a receiving inductive unit, wherein:
      the intermediate inductive unit has a quality factor ($Q_t$);
      the receiving inductive unit has another quality factor ($Q_l$);
      the intermediate inductive unit is configured to alter the shape of the generated alternating magnetic field to optimize coupling efficiency between the driving inductive unit and the receiving inductive unit such that maximum power transfer is achieved by, for a given coupling factor ($k_2$) between the receiving inductive unit and the intermediate inductive unit, selecting one of a coupling factor ($k_1$) between the driving inductive unit and the intermediate inductive unit or a further quality factor ($Q_d$) of the driving inductive unit, and determining the other of the coupling factor ($k_1$) or the further quality factor ($Q_d$) to achieve a loading factor (N) of value 1 according to:

$$N = \frac{k_1^2 Q_d Q_t}{1 + k_2^2 Q_t Q_l}; \text{ and}$$

the driving inductive unit is configured to be in communication with the receiving inductive unit without requiring any other intermediate inductive units.

2. The apparatus of claim 1, wherein the apparatus is further configured to transfer power from the driving inductive unit to the receiving inductive unit via a wireless link.

3. The apparatus of claim 2, wherein the apparatus is further configured to charge, via the wireless link, a battery connected to the receiving inductive unit.

4. The apparatus of claim 1, wherein the apparatus is further configured to transfer data via a wireless link.

5. The apparatus of claim 4, wherein the data comprises control signals.

6. The apparatus of claim 1, wherein the receiving inductive unit is configured to capture the alternating magnetic field and provide a voltage output.

7. The apparatus of claim 1, wherein the receiving inductive unit is implanted in an object.

8. The apparatus of claim 7, wherein the object is a human body.

9. The apparatus of claim 7, wherein the object is a machine.

10. The apparatus of claim 7, wherein the apparatus is further configured to transmit a control signal to the receiving inductive unit to operate the object.

11. The apparatus of claim 1, wherein the intermediate inductive unit is configured to decouple the resistance between the driving and receiving inductive units.

12. The apparatus of claim 11, wherein the quality factor of the intermediate inductive unit is not affected by the driving and receiving inductive units.

13. The apparatus of claim 1, wherein the intermediate inductive unit has a high quality factor.

14. The apparatus of claim 1, wherein a second intermediate inductive unit having a quality factor ($Q_r$) is disposed between the intermediate inductive unit and the receiving inductive unit and proximate to the receiving inductive unit, and wherein:
   the intermediate inductive unit is configured to alter the shape of the alternating magnetic field to optimize coupling efficiency between the receiving inductive unit and the driving inductive unit, such that maximum power transfer is achieved by, for the given coupling factor ($k_2$), but between the second intermediate inductive unit and the intermediate inductive unit, and for a given coupling factor ($k_3$) between the receiving inductive unit and the second intermediate inductive unit, selecting one of the coupling factor ($k_1$) between the driving inductive unit and the intermediate inductive unit or the further quality factor ($Q_d$) the driving inductive unit, and determining the other of the coupling factor ($k_1$) or the further quality factor ($Q_d$) to achieve a loading factor (N) of value 1 according to:

$$N = \frac{k_1^2 Q_d Q_t (1 + k_3^2 Q_r Q_l)}{1 + k_2^2 Q_t Q_r + k_3^2 Q_r Q_l}; \text{ and}$$

wherein the apparatus is further configured to transmit data using the alternating magnetic field.

15. A system comprising:
a receiving inductive unit, the receiving inductive unit configured to capture an alternating magnetic field from a driving inductive unit and provide a voltage output;
an intermediate inductive unit disposed between the receiving inductive unit and the driving inductive unit, the intermediate inductive unit disposed proximate to the receiving inductive unit, wherein:
the intermediate inductive unit has a quality factor ($Q_t$);
the receiving inductive unit has another quality factor ($Q_l$);
the intermediate inductive unit is configured to alter the shape of the alternating magnetic field to optimize coupling efficiency between the receiving inductive unit and the driving inductive unit such that maximum power transfer is achieved by, for a given coupling factor ($k_2$) between the receiving inductive unit and the intermediate inductive unit, selecting one of a coupling factor ($k_1$) between the driving inductive unit and the intermediate inductive unit or a further quality factor ($Q_d$) of the driving inductive unit, and determining the other of the coupling factor ($k_1$) or the further quality factor ($Q_d$) to achieve a loading factor (N) of value 1 according to:

$$N = \frac{k_1^2 Q_d Q_t}{1 + k_2^2 Q_t Q_l}; \text{ and}$$

the receiving inductive unit is configured to be in communication with the driving inductive unit without requiring any other intermediate inductive units.

16. The system of claim 15, wherein the driving inductive unit is configured to generate the alternating magnetic field.

17. The system of claim 15, wherein the receiving inductive unit and the intermediate inductive unit are implanted in an object.

18. The system of claim 15, wherein a second intermediate inductive unit having a quality factor ($Q_r$) is disposed between the intermediate inductive unit and the receiving inductive unit and proximate to the receiving inductive unit, and wherein:
the intermediate inductive unit is configured to alter the shape of the alternating magnetic field to optimize coupling efficiency between the receiving inductive unit and the driving inductive unit such that maximum power transfer is achieved by, for the given coupling factor ($k_2$), but between the second intermediate inductive unit and the intermediate inductive unit, and for a given coupling ($k_3$) between the receiving inductive unit and the second intermediate inductive unit, selecting one of the coupling factor ($k_1$) between the driving inductive unit and the intermediate inductive unit or the further quality factor ($Q_d$) of the driving inductive unit, and determining the other of the coupling factor ($k_1$) or the further quality factor ($Q_d$) to achieve a loading factor (N) of value 1 according to:

$$N = \frac{k_1^2 Q_d Q_t (1 + k_3^2 Q_r Q_l)}{1 + k_2^2 Q_t Q_r + k_3^2 Q_r Q_l}; \text{ and}$$

wherein said system is further configured to transmit data using said alternating magnetic field.

19. The system of claim 18, wherein the second intermediate inductive unit is configured to decouple the resistance between the driving and receiving inductive units.

20. The system of claim 18, wherein the second intermediate inductive unit has a high quality factor.

21. A method comprising:
forming a driving inductive unit, the driving inductive unit coupled to an electric source and configured to generate an alternating magnetic field; and
forming an intermediate inductive unit disposed between the driving inductive unit and a receiving inductive unit, wherein:
the intermediate inductive unit has a quality factor ($Q_t$);
the receiving inductive unit has another quality factor ($Q_l$);
the intermediate inductive unit is configured to alter the shape of the generated alternating magnetic field to optimize coupling efficiency between the driving inductive unit and the receiving inductive unit such that maximum power transfer is achieved by, for a given coupling factor ($k_2$) between the receiving inductive unit and the intermediate inductive unit, selecting one of a coupling factor ($k_1$) between the driving inductive unit and the intermediate inductive unit or a further quality factor ($Q_d$) of the driving inductive unit, and determining the other of the coupling factor ($k_1$) or the further quality factor ($Q_d$) to achieve a loading factor (N) of value 1 according to:

$$N = \frac{k_1^2 Q_d Q_t}{1 + k_2^2 Q_t Q_l}; \text{ and}$$

the driving inductive unit configured to be in communication with the receiving inductive unit without requiring any other intermediate inductive units.

22. The method of claim 21, wherein the driving inductive unit is configured to transfer power to the receiving inductive unit via a wireless link.

23. The method of claim 22, wherein the driving inductive unit is configured to charge, via the wireless link, a battery connected to the receiving inductive unit.

24. The method of claim 21, wherein the driving inductive unit is configured to transfer data to the receiving inductive unit via a wireless link.

25. The method of claim 24, wherein the data comprises control signals.

26. The method of claim 21, wherein the receiving inductive unit is configured to capture the alternating magnetic field and provide a voltage output.

27. The method of claim 21, wherein the receiving inductive unit is implanted in an object.

28. The method of claim 27, wherein the object is a human body.

29. The method of claim 27, wherein the object is a machine.

30. The method of claim 27, wherein the driving inductive unit is configured to transmit a control signal to the receiving inductive unit to operate the object.

31. The method of claim 21, wherein the intermediate inductive unit is configured to decouple the resistance between the driving and receiving inductive units.

32. The system of claim 19, wherein the quality factor of the intermediate inductive unit is not affected by the driving and receiving inductive units.

33. The method of claim 21, wherein the intermediate inductive unit has a high quality factor.

34. An apparatus comprising:
a receiving inductive unit configured to capture an alternating magnetic field generated by a driving inductive unit wherein said alternating magnetic field includes data information; and an intermediate inductive unit disposed between the receiving inductive unit and the driving inductive unit, wherein:

the receiving inductive unit and the intermediate inductive unit are configured to receive the alternating magnetic field generated by the driving unit after it has been further altered by a second intermediate inductive unit;

the intermediate inductive unit is configured to alter the shape of the generated alternating magnetic field to optimize coupling efficiency between the driving inductive unit and the receiving inductive unit such that maximum power transfer is achieved by, for a given coupling factor ($k_2$) between the second intermediate inductive unit and the intermediate inductive unit, for a given coupling factor ($k_1$) between the driving inductive unit and the second intermediate inductive unit, for a given quality factor ($Q_d$) of the driving inductive unit, for a given quality factor ($Q_t$) of the second intermediate inductive unit, and for a given quality factor ($Q_l$) of the receiving inductive unit, selecting one of a coupling factor ($k_3$) between the receiving inductive unit and the intermediate inductive unit or a quality factor ($Q_r$) of the intermediate inductive unit, and determining the other of the coupling factor ($k_3$) or the quality factor ($Q_r$) to achieve a loading factor (N) of value 1 according to:

$$N = \frac{k_1^2 Q_d Q_t (1 + k_3^2 Q_r Q_l)}{1 + k_2^2 Q_t Q_r + k_3^2 Q_r Q_l}.$$

35. The apparatus of claim 34, wherein the apparatus is implantable in an object.

36. The apparatus of claim 35, wherein the object is a human body.

37. The apparatus of claim 35, wherein the object is a machine.

38. A multicoil telemetry apparatus, comprising:

a driving inductive unit having a quality factor ($Q_d$), the driving inductive unit coupled to an electric source and configured to generate an alternating magnetic field; and an intermediate inductive unit having a quality factor ($Q_t$) and disposed between the driving inductive unit and a receiving inductive unit, wherein:

the receiving inductive unit has another quality factor ($Q_l$); and the intermediate inductive unit is configured to alter the shape of the generated alternating magnetic field to optimize coupling efficiency between the driving inductive unit and the receiving inductive unit such that maximum power transfer is achieved by, for a coupling factor ($k_1$) between the driving inductive unit and the intermediate inductive unit and a coupling factor ($k_2$) between the receiving inductive unit and the intermediate inductive unit, the intermediate inductive unit being configured to achieve a loading factor (N) of value 1 according to:

$$N = \frac{k_1^2 Q_d Q_t}{1 + k_2^2 Q_t Q_l}.$$

39. A multicoil telemetry apparatus, comprising:

a driving inductive unit having a quality factor ($Q_d$), the driving inductive unit coupled to an electric source and configured to generate an alternating magnetic field; and a first intermediate inductive unit having a quality factor ($Q_t$), the first intermediate inductive unit being disposed between the driving inductive unit and a second intermediate inductive unit that is disposed between the first intermediate inductive unit and a receiving inductive unit, wherein:

the second intermediate inductive unit has a quality factor ($Q_r$);

the receiving inductive unit has another quality factor ($Q_l$);

the first intermediate inductive unit is configured to alter the shape of the generated alternating magnetic field to optimize coupling efficiency between the driving inductive unit and the receiving inductive unit such that maximum power transfer is achieved by, for a coupling factor ($k_1$) between the driving inductive unit and the first intermediate inductive unit, a coupling factor ($k_2$) between the first intermediate inductive unit and the second intermediate inductive unit, and a coupling factor ($k_3$) between the second intermediate inductive unit and the receiving inductive unit, the first intermediate inductive unit being configured to achieve a loading factor (N) of value 1 according to:

$$N = \frac{k_1^2 Q_d Q_t (1 + k_3^2 Q_r Q_l)}{1 + k_2^2 Q_t Q_r + k_3^2 Q_r Q_l}.$$

40. A multicoil telemetry apparatus, comprising:

a receiving inductive unit having a quality factor ($Q_l$); and a first intermediate inductive unit having a quality factor ($Q_r$), the first intermediate inductive unit is disposed between the receiving inductive unit and a second intermediate inductive unit that is disposed between the first intermediate inductive unit and a driving inductive unit, wherein:

the second intermediate inductive unit has a quality factor ($Q_t$);

the driving inductive unit has a quality factor ($Q_d$); and the first intermediate inductive unit is configured to alter the shape of the generated alternating magnetic field to optimize coupling efficiency between the driving inductive unit and the receiving inductive unit such that maximum power transfer is achieved by, for a coupling factor ($k_1$) between the driving inductive unit and the second intermediate inductive unit, a coupling factor ($k_2$) between the first intermediate inductive unit and the second intermediate inductive unit, and a coupling factor ($k_3$) between the first intermediate inductive unit and the receiving inductive unit, the first intermediate inductive unit being configured to achieve a loading factor (N) of value 1 according to:

$$N = \frac{k_1^2 Q_d Q_t (1 + k_3^2 Q_r Q_l)}{1 + k_2^2 Q_t Q_r + k_3^2 Q_r Q_l}.$$

* * * * *

UNITED STATES PATENT AND TRADEMARK OFFICE
CERTIFICATE OF CORRECTION

PATENT NO. : 9,368,273 B2
APPLICATION NO. : 13/417145
DATED : June 14, 2016
INVENTOR(S) : Anil Kumar Ram Rakhyani et al.

It is certified that error appears in the above-identified patent and that said Letters Patent is hereby corrected as shown below:

In the Specification:

At column 7, line number 64, insert --,-- after "$k_1$".

In the Claims:

At column 22, claim number 14, line number 56, insert --of-- after "$(Q_d)$".
At column 23, claim number 18, line number 49, insert --factor-- after "coupling".

Signed and Sealed this
Twenty-third Day of August, 2016

Michelle K. Lee
*Director of the United States Patent and Trademark Office*